US009892210B2

(12) United States Patent
Cho et al.

(10) Patent No.: US 9,892,210 B2
(45) Date of Patent: Feb. 13, 2018

(54) PARTIAL GRAPH INCREMENTAL UPDATE IN A SOCIAL NETWORK

(71) Applicant: Microsoft Technology Licensing, LLC, Redmond, WA (US)

(72) Inventors: SungJu Cho, Cupertino, CA (US); Qingpeng Niu, Columbus, OH (US); Andrew Joseph Carter, Mountain View, CA (US); Sanjay Sachdev, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 14/546,790

(22) Filed: Nov. 18, 2014

(65) Prior Publication Data

US 2016/0125093 A1    May 5, 2016

Related U.S. Application Data

(60) Provisional application No. 62/073,684, filed on Oct. 31, 2014.

(51) Int. Cl.
| G06F 7/00 | (2006.01) |
| G06F 17/00 | (2006.01) |
| G06F 17/30 | (2006.01) |
| H04L 12/733 | (2013.01) |
| H04L 29/06 | (2006.01) |
| G06Q 10/10 | (2012.01) |

(52) U.S. Cl.
CPC .. *G06F 17/30958* (2013.01); *G06F 17/30622* (2013.01); *G06Q 10/10* (2013.01); *H04L 45/20* (2013.01); *H04L 65/403* (2013.01)

(58) Field of Classification Search
None
See application file for complete search history.

(56) References Cited

U.S. PATENT DOCUMENTS

| 7,281,005 B2* | 10/2007 | Canright | G06F 17/30864 |
| 2010/0153404 A1* | 6/2010 | Ghosh | G06F 17/30699 |
| | | | 707/748 |

(Continued)

OTHER PUBLICATIONS

"International Application Serial No. PCT/US2015/021879, International Search Report dated Jul. 16, 2015", 4 pgs.

(Continued)

*Primary Examiner* — Susan Chen
(74) *Attorney, Agent, or Firm* — Schwegman Lundberg & Woessner, P.A.

(57) ABSTRACT

A social graph is divided into a series of partial graphs having limited hops and reference counts. For each of a plurality of nodes in the social graph, a partial graph for the node is created having a first degree list of nodes reachable in one hop and a second degree list of nodes reachable in two hops. Reference counts of how many paths exist between the node and each node reachable in two hops are also added to the second degree list. A global inverted index is maintained containing a list of all nodes in the social graph and for each node in the social graph a list of nodes that directly connect to the node. The partial graphs created for each of the plurality of nodes are distributed across a plurality of data servers. An index of which partial graphs are stored on which data servers is maintained.

20 Claims, 16 Drawing Sheets

(56) References Cited

U.S. PATENT DOCUMENTS

| | | | |
|---|---|---|---|
| 2010/0199328 A1* | 8/2010 | Heins | G06Q 10/10 726/3 |
| 2012/0317121 A1 | 12/2012 | Fuchs et al. | |
| 2013/0086063 A1* | 4/2013 | Chen | G06F 17/30595 707/736 |
| 2013/0097180 A1* | 4/2013 | Tseng | G06F 17/30722 707/748 |
| 2013/0124538 A1* | 5/2013 | Lee | G06F 17/3053 707/749 |
| 2013/0290226 A1* | 10/2013 | Dokken | G06N 5/02 706/12 |
| 2015/0227619 A1* | 8/2015 | Xie | G06F 17/30864 707/706 |
| 2015/0302063 A1* | 10/2015 | Nigam | G06F 17/30545 707/770 |

OTHER PUBLICATIONS

"International Application Serial No. PCT/US2015/021879, Written Opinion dated Jul. 16, 2015", 8 pgs.

Auradkar, Aditya, et al., "Data Infrastructure at LinkedIn", 28th International Conference on Data Engineering (ICDE 2012), (Apr. 1, 2012), 1370-1381.

Özsu, Tamer M, et al., "Principles of Distributed Database Systems—Third Edition—Chapters 4, 6, 17", Principles of Distributed Database Systems, Third Edition, (Mar. 2, 2011), 131-169; 205-220; 657-722.

Song, Qing, et al., "Partitioning Graphs to Speed Up Point-to-Point Shortest Path Computations", Decision and Control and European Control Conference (CDC-ECC), 2011 50th IEEE, (Dec. 12, 2011), 5299-5304.

* cited by examiner

PARTIAL GRAPH INCREMENTAL UPDATE IN A SOCIAL NETWORK

CROSS-REFERENCE TO RELATED APPLICATIONS

This application claims the benefit of U.S. Provisional Application No. 62/073,684, filed Oct. 31, 2014, which is incorporated herein by reference in its entirety.

TECHNICAL FIELD

The present disclosure generally relates to information retrieval and processing. More specifically, the present disclosure relates to methods, systems and computer program products for performing partial graph incremental update in a social network.

BACKGROUND

Online social network services provide members with a mechanism for defining, and memorializing in a digital format, representations of themselves (e.g., member profiles) and their relationships with other people. This digital representation of relationships between members is frequently referred to as a social graph. Many social graphs store important entities such as member identification, school, company, location, and so forth in the form of social graph data structure comprising vertices and edges. Many such implementations adopt key-value stores in which a vertex is a key and its adjacency list of edges is a value. For example, the member identification may be the key and its first degree connections may be corresponding values.

Popular social graph services, such as finding paths, computing network distance, and counting network size, utilize breadth-first traversal through the social graph data structure. For example, in order to compute network distance between two vertices, the system may traverse the first-degree connections and check whether the first-degree connections contain the other vertex. If so, then the network distance is determined to be first degree. If not, then the second-degree connections are traversed to see if the second-degree connections contain the other vertex. This process may continue until it is determined which degree connections contain the other vertex.

Typically under breadth-first traversal when computing network distance, the key-value store containing the vertex and its adjacency list needs to be looked up over and over until the distance is determined. The number of look-ups in this key-value store can grow rapidly as higher and higher degrees of separation are searched due to the exponential growth in number of vertices. The result is that popular graph services, having lots of members, require significantly high numbers of key-value store look-ups.

For scalability, social network services typically adopt distributed data stores, which distribute the entire social graph over multiple servers. This can cause high latency during breath-first traversal, however, since it requires multiple remote calls to other machines to fetch connections of vertices. For example, if the system needs to fetch second-degree connections of a vertex, it may need to make remote calls to most of the data stores to fetch the connections of the first-degree connections of the vertex, because it is unclear which server hosts the data related to the vertex in question. This means that one single request for a network distance, for example, can cause multiple steps of remote calls to various distributed data stores, which causes slower response time and utilizes network bandwidth.

DESCRIPTION OF THE DRAWINGS

Some embodiments of the technology are illustrated by way of example and not limitation in the figures of the accompanying drawings.

DETAILED DESCRIPTION

Overview

The present disclosure describes, among other things, methods, systems, and computer program products, which individually provide functionality for quantifying social capital for users in a social network service. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

One way to address the issue of multiple remote calls being made to distributed data stores for portions of social graph data is to adopt a partial graph caching strategy in which several degrees of vertices and edges are cached from each member. However, an ever-changing social graph can cause data in the cache to be stale as it can contain old network information. Updating a stale cache requires high latency due to multiple remote calls. Therefore, a better caching strategy would be one that accepts high latency for updating or servicing stale data.

In an example embodiment, incremental updates are performed on partial graphs in order to serve ever-fresh results and low latency by eliminating the need for on-the-fly high-cost partial graph computation. In the incremental updates, the system may receive graph change events such as addition/deletion of a node/edge. It may then incrementally update the partial graph for each event. Since the system holds a fresh partial graph, the graph traversals do not require high-cost partial graph computation and remote calls to data stores, which speed service. Additionally, the data being served is always fresh, since the incrementally updated partial graph has the freshest data.

In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Suitable System

Figure 1:
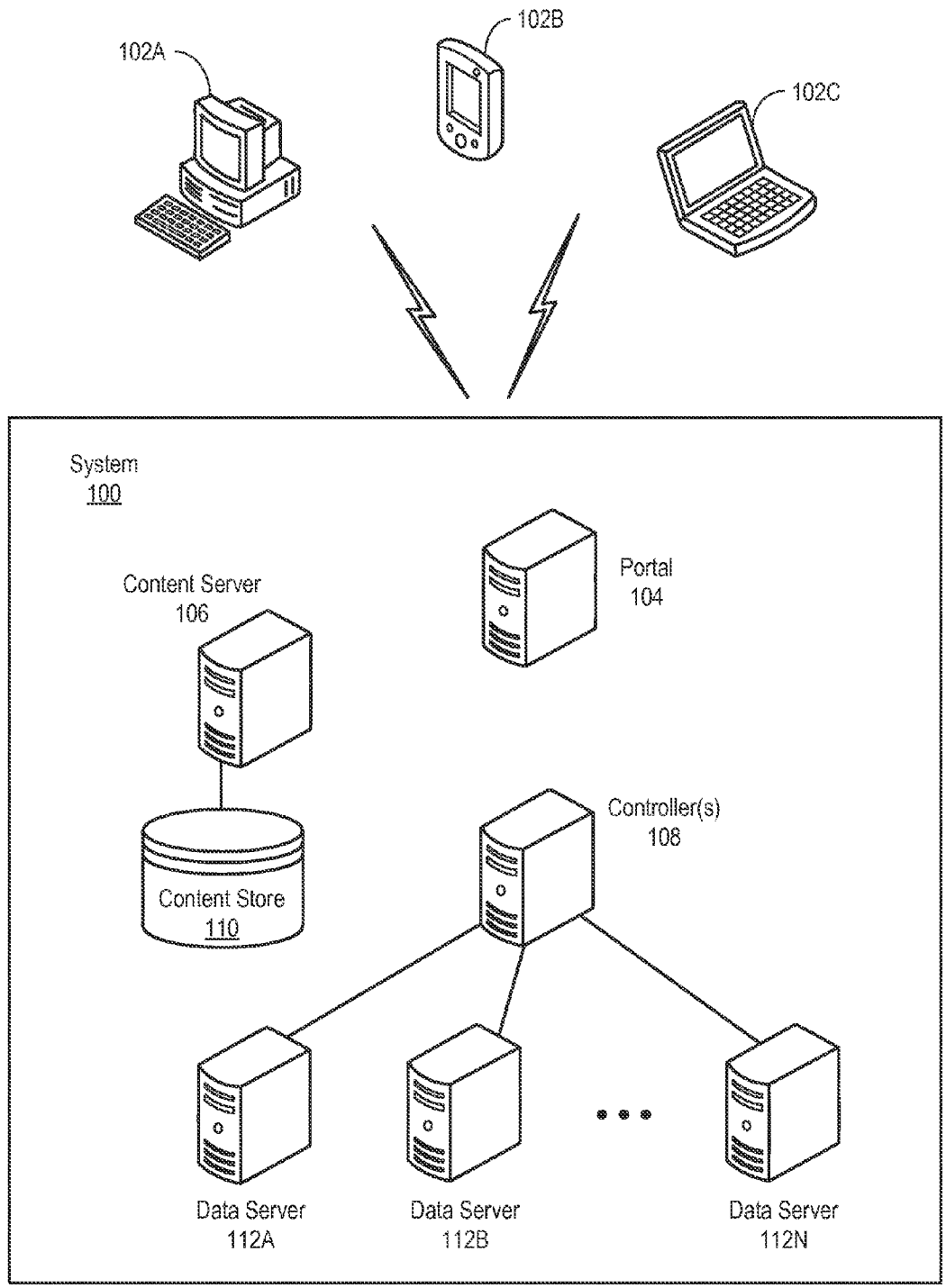
FIG. 1 is a block diagram of a system for managing a social network in accordance with an example embodiment.

FIG. 1 is a block diagram of a system 100 for managing a social network in accordance with an example embodiment. In an example embodiment, the system 100 may be implemented as or within a data center of an organization that hosts an online application or service that maintains the data of the social network. In some example embodiments, the system 100 is operated within a professional or social networking service that helps members create, develop, and maintain professional (and/or personal) relationships. In these implementations, the data may illustratively represent the members and their connections to each other.

Members or users of a service or application offered by the system 100 may connect to the system 100 via one or more client devices 102A. 102B, 102C, which may be stationary (e.g., desktop computer, workstation) or mobile (e.g., smart phone, tablet computer, laptop computer). The client devices 102A-C may operate suitable client applications, such as a browser program or an application designed specifically to access the service(s) offered by the system 100. Users of the system 100 may be termed members because they may be required to register with the system 100 in order to fully access the available services.

User connections may generally be made through a portal 104, which may comprise an application server, a web server, and/or some other gateway or entry point. The system 100 also includes a content server 106, controller(s) 108, content store 110, and data servers 112A-112N.

As part of the services it offers, the system 100 may serve content for presentation to users via their client devices 102A-102C. The content that is served may include, for example, status updates, messages, advertisements, offers, announcements, job listings, news, and so on, and may be or may include any type of media (e.g., text, images, video, audio). The system 100 may serve content generated by users of the system 100's services, and/or content supplied by third parties for delivery to users of those services.

The content server 106 may maintain one or more repositories of content items for serving to members (e.g., content store 110), an index of the content items, and/or other information useful in serving content to members. Illustratively, the content server 106 may serve on the order of hundreds of millions of content items every day, for each of which the system 100 may store an event record (in addition to data reflecting other user activity).

As indicated above, the content store 110 may include various types of content and content items, including status updates, information released by members and possibly non-members (e.g., announcements, messages), documents, advertisements (e.g., both revenue and non-revenue ads), job listings, media content (e.g., images, video, audio), and so on, for serving to members and/or for use by various components of the system 100. The content server 106 (or some other component of the system 100) may include a recommendation module for recommending content to serve to a member.

Members of a service hosted by the system 100 may have corresponding pages (e.g., web pages, content pages) on the system 100, which they may use to facilitate their activities with the system and with each other. These pages (or information provided to members via these pages) may be available to some or all other members to visit in order to browse messages, announcements, and/or other information provided by or associated with the corresponding member. Members' pages may be stored on a component of system 100 depicted in FIG. 1, or on a component not shown in the figure.

In an example embodiment, data servers 112A-112N store data representing a graph of members' connections, in which each node corresponds to one member or user, and each edge between two nodes corresponds to a relationship between the members/users represented by the two nodes. In different embodiments, relationships may be explicit, implicit, or a combination of explicit and implicit. An explicit relationship is formed when one member explicitly requests a relationship with another member and that other member assents. An implicit relationship is formed through more casual types of contact, such as when one member sends a message to another (e.g., a chat message, an electronic mail message), when two members exhibit identical behavior or interests (e.g., by mutually "liking" or "sharing" one or more content items), and/or in other ways. Members of a group may be connected by explicit or implicit relationships.

The network of members of a service offered by the system 100 may number in the tens or hundreds of millions. Accordingly, a graph of the members' connections may be distributed among any number of data servers 112A-112N. In some example embodiments, the graph data is divided by node (i.e., member), with each data server responsible for maintaining some number of nodes. Illustratively, a node stored by a data server may include some or all attributes of the corresponding member; in particular, a node includes or is accompanied by information identifying all other members to which the corresponding member is directly connected. In other words, a node's data may include all edges that connect to that node, and each edge identifies a node at the other end of that edge. This may be known as a vertex centric partial graph.

As will be described in more detail below, in some example embodiments, rather than storing a bare-bones partial graph for each member/node, which may cause excessive calls to be made between data servers 112A-112N, a vertex centric partial graph with limited hops is stored. This vertex centric partial graph with limited hops may store, for each appropriate node/vertex, a list of all first degree connections and a list of second degree connections (as well as additional degree connections depending upon the restrictiveness which the system designer places on the hops).

Additionally, as will also be described in more detail below, in some example embodiments, the vertex centric partial graph with limited hops include reference counts for items listed in the second degree (or higher) connections list. These reference counts can be utilized to manage the process performed when deleting a connection.

The system 100 may include other components not illustrated in FIG. 1. For example, in some example embodiments, the system 100 may include a profile server to maintain profiles, in a profile database, of members of the service(s) hosted by the system 100.

An individual member's profile may reflect any number of attributes or characteristics of the member, including personal (e.g., gender, age or age range, interests, hobbies, member ID), professional (e.g., employment status, job title, functional area or industry, employer, skills, endorsements, professional awards), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify who sent a message, to identify a recipient of a status update, to record a content-delivery event).

Organizations may also be members of the service (i.e., in addition to individuals), and may have associated descriptions or profiles comprising attributes such as industry (e.g., information technology, manufacturing, finance), size, location, goal, etc. An "organization" may be a company, a corporation, a partnership, a firm, a government agency or entity, a not-for-profit entity, an online community (e.g., a user group), or some other entity formed for virtually any purpose (e.g., professional, social, educational).

Profile servers may be combined with the data servers 112A-112N, such that each data server maintains entire profiles of the members corresponding to the nodes stored on the server. Alternatively, the data servers 112A-112N may be distinct from the profile servers, in which case the data servers 112A-112N will store and maintain sufficient member/user information to facilitate searches of and queries on the distributed graph, and the profile servers will store other member information, but there may be overlap between the member information stored on the data servers 112A-112N and on the profile servers.

The functionality of the system 100 may be distributed among the illustrated components in an alternative manner, such as by merging or further dividing functions of one or more components, or may be distributed among a different collection of components. Yet further, while depicted as separate hardware
components (e.g., computer servers) in FIG. 1, one or more of portal 104, content server 106, controller 108, and data servers 112A-112N may alternatively be implemented as separate software modules executing on one or more computer servers. Thus, although only a single instance of a particular component of the system 100 may be illustrated in FIG. 1, it should be understood that multiple instances of some or all components may be utilized. Further, each data server 112A-112N may be replicated or mirrored.

In some example embodiments, each node of a social graph distributed across data servers 112A-N represents an individual member of a service hosted by the system 100, a group or team that includes multiple members, or an organization or a portion of an organization. Nodes of a given distributed graph may be homogeneous (i.e., they all represent the same type of entity), or heterogeneous i.e., different node represent different types of entities).

In these example embodiments, edges may also be homogeneous or heterogeneous. By way of illustration, and without limiting other embodiments, a given edge may represent one member following another member (e.g., an influencer), a member belonging to a team or a group, or a member (or a team or group) working at or following a particular organization.

Figure 2:
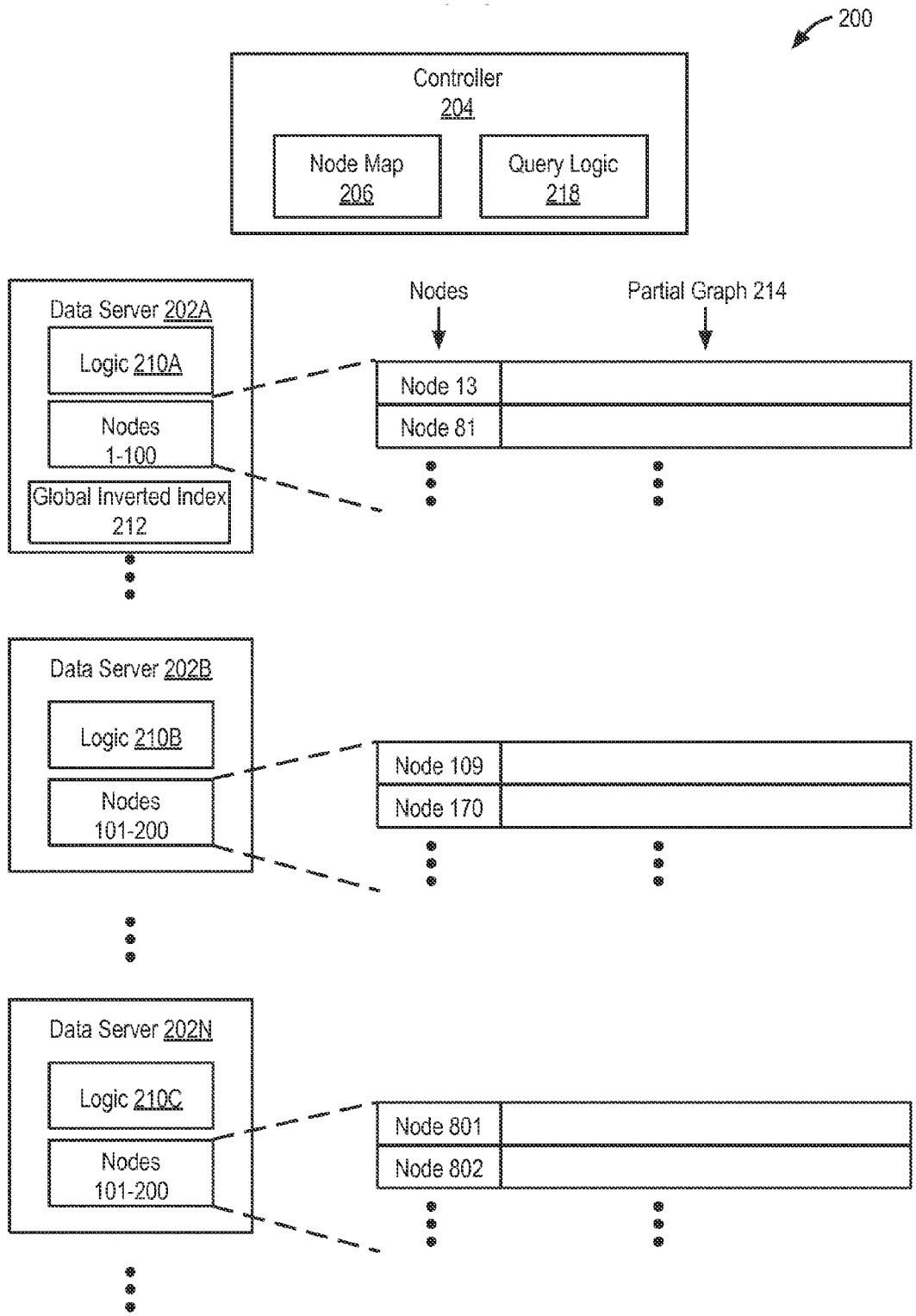
FIG. 2 is a block diagram depicting a system for maintaining partial graphs in accordance with an example embodiment.

FIG. 2 is a block diagram depicting a system 200 for maintaining partial graphs in accordance with an example embodiment. In this embodiment, data servers 202A-202N store portions of a social graph, which may illustratively be a graph of members of a professional or social network as discussed in conjunction with FIG. 1.

Controller 204 may control the execution of queries, searches, and other functions on the graph, and may include a node map 206 that identifies the location of each graph node (i.e., the data server 202A-N on which the node's partial graph is stored), and query logic 208 for executing queries/searches. Although discussed in the context of a breadth-first search, the system 200 of FIG. 2 may alternatively be employed to perform a depth-first search, in other embodiments, as well as other operations.

Illustratively, a breadth-first search might be used to find the shortest path between two nodes, to identify all nodes within one connected component, and/or for other purposes.

For example, a query may be executed to identify one or more nodes through which a given origination node is connected to a given destination node. In the context of a distributed graph representing a professional or social network, this facilitates identification of paths between one member and another member.

As another example, it may be desirable to identify nodes that are some set distance away from a given node, or within some range of distances, and that possess one or more particular attributes. By way of illustration, second degree connections of a given node are located two hops (i.e., two edges) away from that node. Thus, Nth degree connections may be readily identified and then analyzed for some purpose (e.g., to identify nodes that have a specified attribute in common). Each data server 202A-202N may store partial graphs for some number of nodes, and therefore may be considered a "node repository". Alternatively, a "node repository" may refer to a storage device or component that stores node data. For the purpose of illustration, and without limitation, each server maintains approximately 100 nodes in the environment of FIG. 2. In other embodiments, different servers may store different numbers of nodes. Each server also includes logic 210A-210N facilitating execution of a query or search on the graph. In other example embodiments, data servers 202A-202N may include other elements. For example, a data server 202A-N may include node map 206, a subset of node map 206 (e.g., to identify repositories of all nodes directly connected to nodes stored at the data server 202A-N). As another example, a data server 202A-N may include one or more global inverted indexes 212. An illustrative inverted index may identify all nodes that are directly connected to the data server 202A-Ns' node but not stored on that data server 202A-N, may identify all nodes on the data server 202A-N that possess a given attribute (or a given set of attributes), etc. Global inverted indices 212 will be described in more detail below.

Portions of the node data stored at each data server 202A-N are illustrated. Specifically, in an example embodiment, node data for a particular node may include a partial graph 214 with limited hops and reference counts. This will be described in more detail below.

Query logic 218 and 210A-210N may include instructions for execution by the controller 204 and the data servers 202A-202N to receive a search request (or a query), process the request, reissue the request or a follow-on request to other data servers 202A-N as necessary, and to return the results.

In an illustrative implementation of a method for searching a distributed social graph, the controller 204 receives a query from an operator or other component of the system 100 or data center in which the apparatus of FIG. 2 operates. The query may illustratively originate from an application, service, or other software executing on some other computing apparatus of the system 100 or data center.

The controller 204 then dispatches the search request to at least one of the data servers 202A-202N. That data server 202A-202N may provide a full or partial response to the request (i.e., depending on whether it possesses all the necessary information), and may also or instead propagate it to one or more peer data servers 202A-N. For example, a breadth-first search of the graph may require the first data server 202A-N to disseminate the request to other data servers 202A-N that maintain nodes that are directly connected to a node maintained by the first data server 202A-N, and the request may propagate among the data servers 202A-N until one or more results are identified (and returned to the controller), or until the search is terminated or otherwise modified.

One of ordinary skill in the art will appreciate that this differs from traditional methods of conducting a breadth-first search, wherein each data server 202A-N only communicates with the controller 204, and is incapable of propagating the search request by forwarding it directly to another data server 202A-N.

In another example embodiment, this propagation can be reduced or even eliminated by having the data server 202A-202N utilize the global inverted index 212.

Multiple controllers 204 may be implemented, perhaps as part of a load-balancing scheme. Similarly, each data server 202A-202N may represent a cluster or other cooperative group of servers maintaining one set of nodes, and/or individual data server 202A-Ns' data may be replicated, mirrored, or otherwise duplicated.

Example of Social Graph Data

Figure 3:
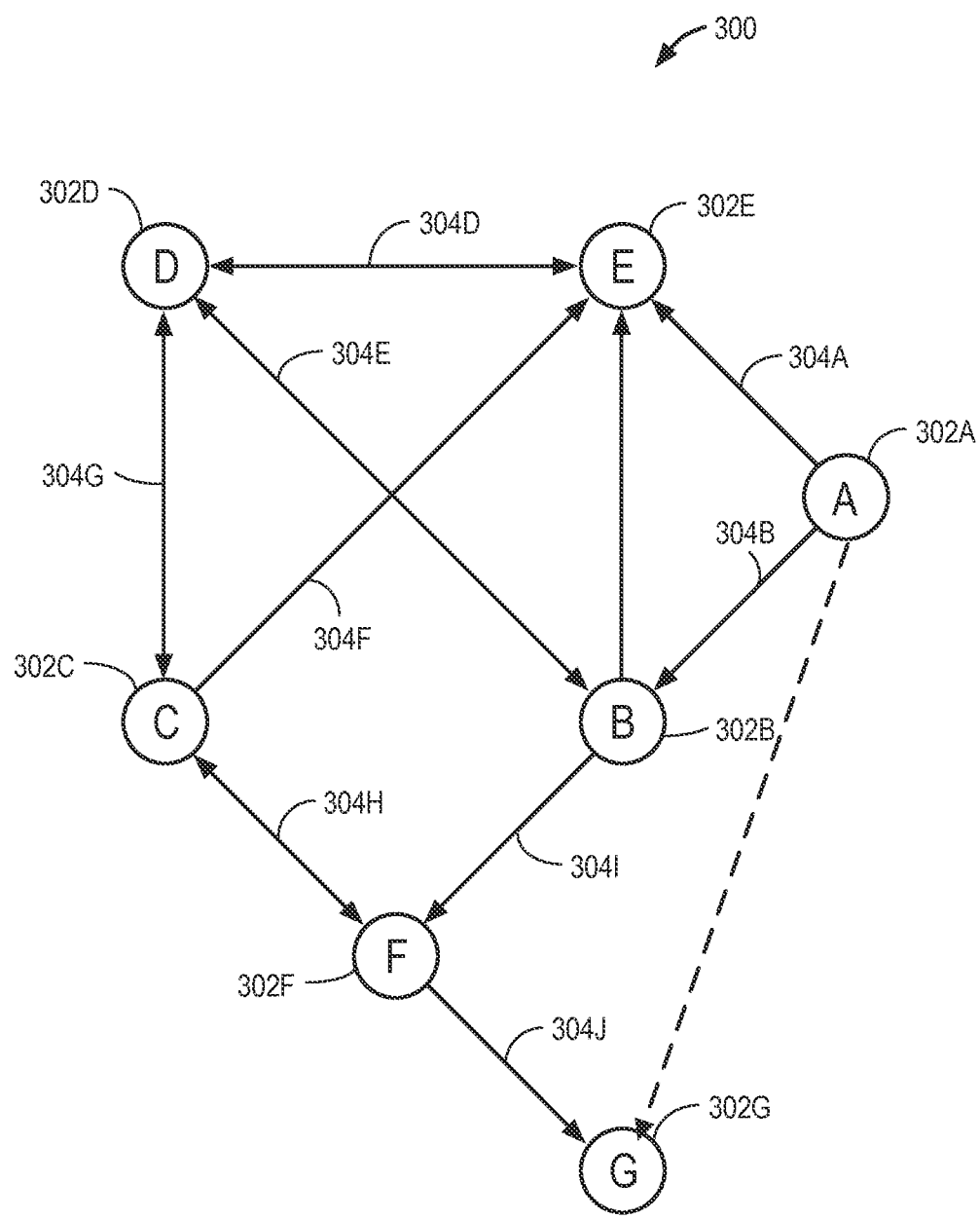
FIG. 3 is a diagram illustrating an example of a full social graph in accordance with an example embodiment.
Figure 4:
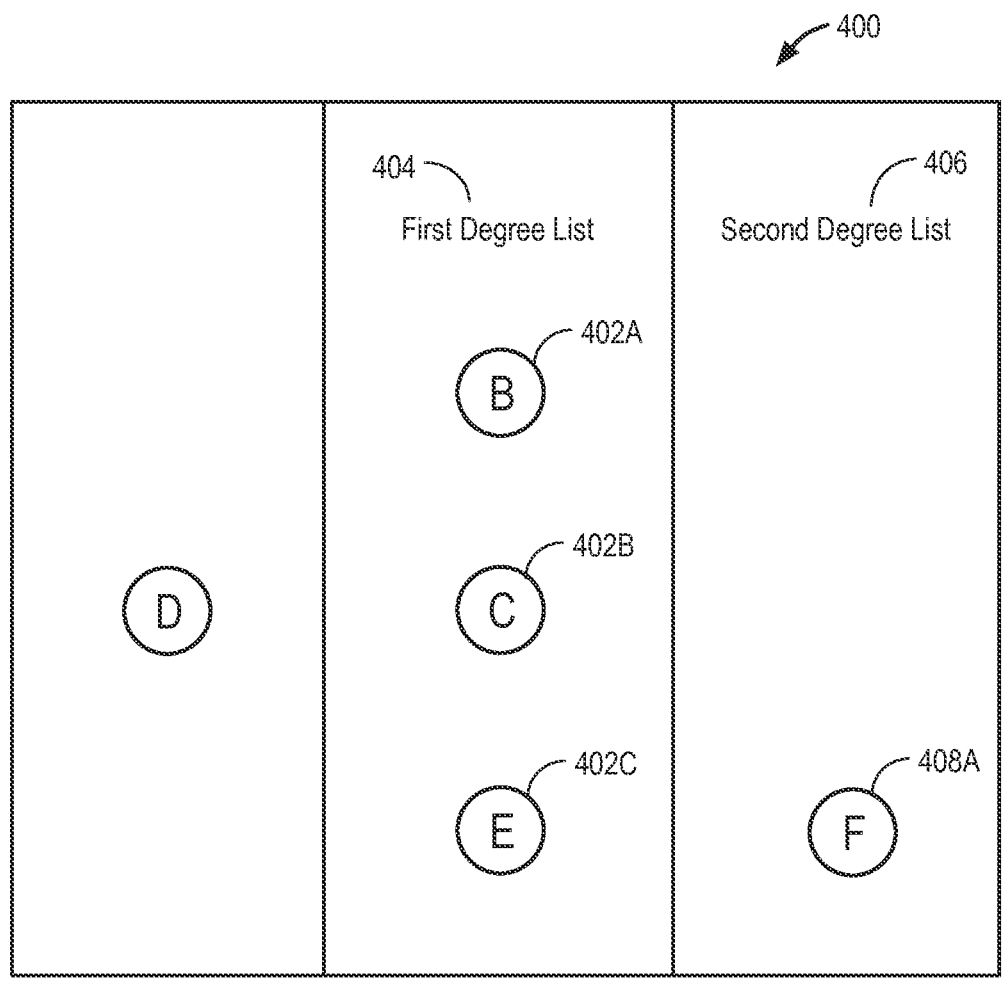
FIG. 4 is a diagram illustrating an example of a partial graph in accordance with an example embodiment.

As discussed above, in an example embodiment, a partial graph is created based on information from a full social graph. FIG. 3 is a diagram illustrating an example of a full social graph 300 in accordance with an example embodiment. In this example, the full social graph 300 contains seven nodes/members 302A-302G as well as edges/connections 304A-304J connecting them. One of the nodes 302A-G may be selected as a vertex of a partial graph having limited hops. FIG. 4 is a diagram illustrating an example of a partial graph 400 in accordance with an example embodiment. Here, node/member D 302D of FIG. 3 is selected as the vertex of the partial graph 400. This partial graph 400 stores up to 2 hops, with each hop representing a degree of connection to the vertex. Since in FIG. 3 node D 302D connects directly to B 302B, C 302C, and E 302E, these become elements 402A, 402B, 402C in the first degree list 404. From node D 302D. 2 hops reach nodes F 302F, E 302E, and D 302D. Notably, node E 302E is already in the first degree list 404, so it is not included in the second degree list 406, while node D 302D is the vertex and also is not included in the second degree list 406. The second degree list 406 therefore includes only node F 408A.

This partial graph layout is very efficient for breadth-first traversal since the system 100 may iterate only one list per hop. If the list stores the elements in sorted order with, for example, vertex ID or attributes as a key, the traversal implementation becomes even better using a binary search algorithm. If the list is large enough, it can be sliced into multiple chunks, with the index of the first or last element in each chunk, which allows even better traversal efficiency using a skip-list like search performance. In addition, since only the necessary elements are stored in each list, the partial graph 400 uses minimum storage space.

Incremental Update

In an example embodiment, incremental update is applied to the partial graph layout described above. In incremental update, a new edge is added in the partial graph 400 of the member. For example, referring back to FIG. 3, if it is assumed that a new edge is added between two nodes 302A-G, such as between node D 302D and node A 302A, then the edge is added into each of the node A 302A and node D 302D's partial graphs 400. Thus, FIG. 4 would be modified so that node/member A 302A is added to the first degree list 404. A similar first degree list 404 in node A 302A's partial graph (not pictured) would also add D 302D. Additionally, subsets of the partial graphs from each of the nodes 302A-G would be added to the other node 302A-Gs' partial graph. Thus, a subset of node A 302A's partial graph would be added to node D 302D's partial graph 400, and a subset of node D 302D's partial graph 400 would be added to node A 302A's partial graph. This allows nodes 302A-G in node A 302A's partial graph that are close enough to node A 302A to be considered for node D 302D's partial graph 400 to be added to node D's partial graph if appropriate, and vice versa. For example, in FIG. 3, node G 302G is three hops away from node D 302D and thus would not ordinarily be in node D 302D's partial graph 400 (which only stores to two hops), but now that a connection exists between node D 302D and node A 302A, it is appropriate to add the 1-hop connections from node A 302A, including node G 302G, into the partial graph 400 for node D 302D.

It should be noted that this section describes the addition of "a connection" between two nodes 302A-G in terms of a bidirectional connection. In practice, when such a bidirectional connection is made (or deleted), the actions undertaken involve performing addition (or deletion) actions for each direction of the connection. Thus, the connection between node A 302A and node D 302D above is actually two unidirectional connections, one from node A 302A to node D 302D and the other from node D 302D to node A 302A. The precise algorithms described in later sections to handle the addition or deletion of connections deal with unidirectional connections, and thus may be run multiple times using different inputs if a bidirectional connection is added or deleted.

In an example embodiment, the deletion of an edge 304A-J uses additional computations. The deletion of an edge 304A-J between two nodes 302A-G, such as between node D 302D and node A 302A includes first deleting the edge 304A-J in each of the node 302A-Gs' partial graph. Thus, node A 302A will be removed from the first degree list 404 for node D 302D and similar modifications will be made to the partial graph for node A 302A. However, it can be more complicated when considering the subsets of partial graphs that were previously added. These subsets can be identified by referring to the previous version of the corresponding vertices, but it is possible that some nodes 302A-G in node D 302D's partial graph 400 may be shared in node A 302A's partial graph, for example.

Figure 5:
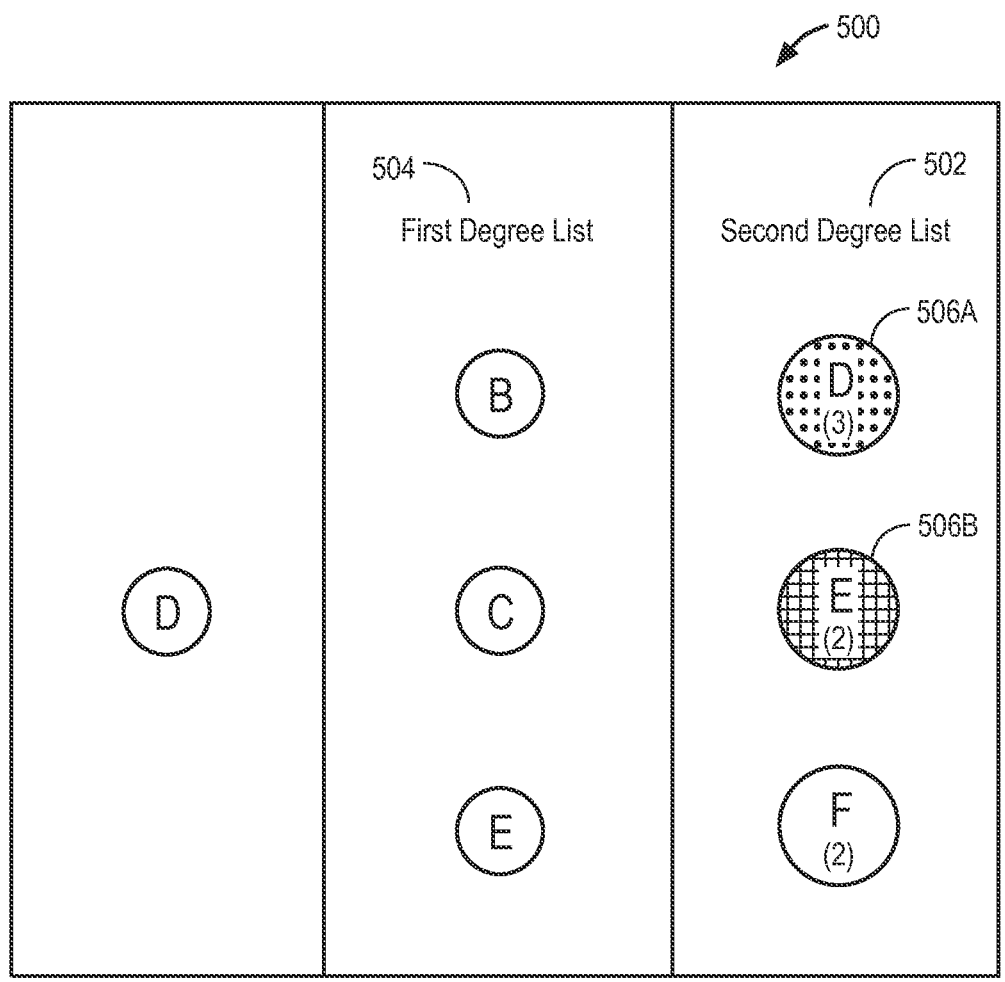
FIG. 5 is a diagram illustrating a partial graph having limited hops and reference counts in accordance with an example embodiment.
Figure 6:
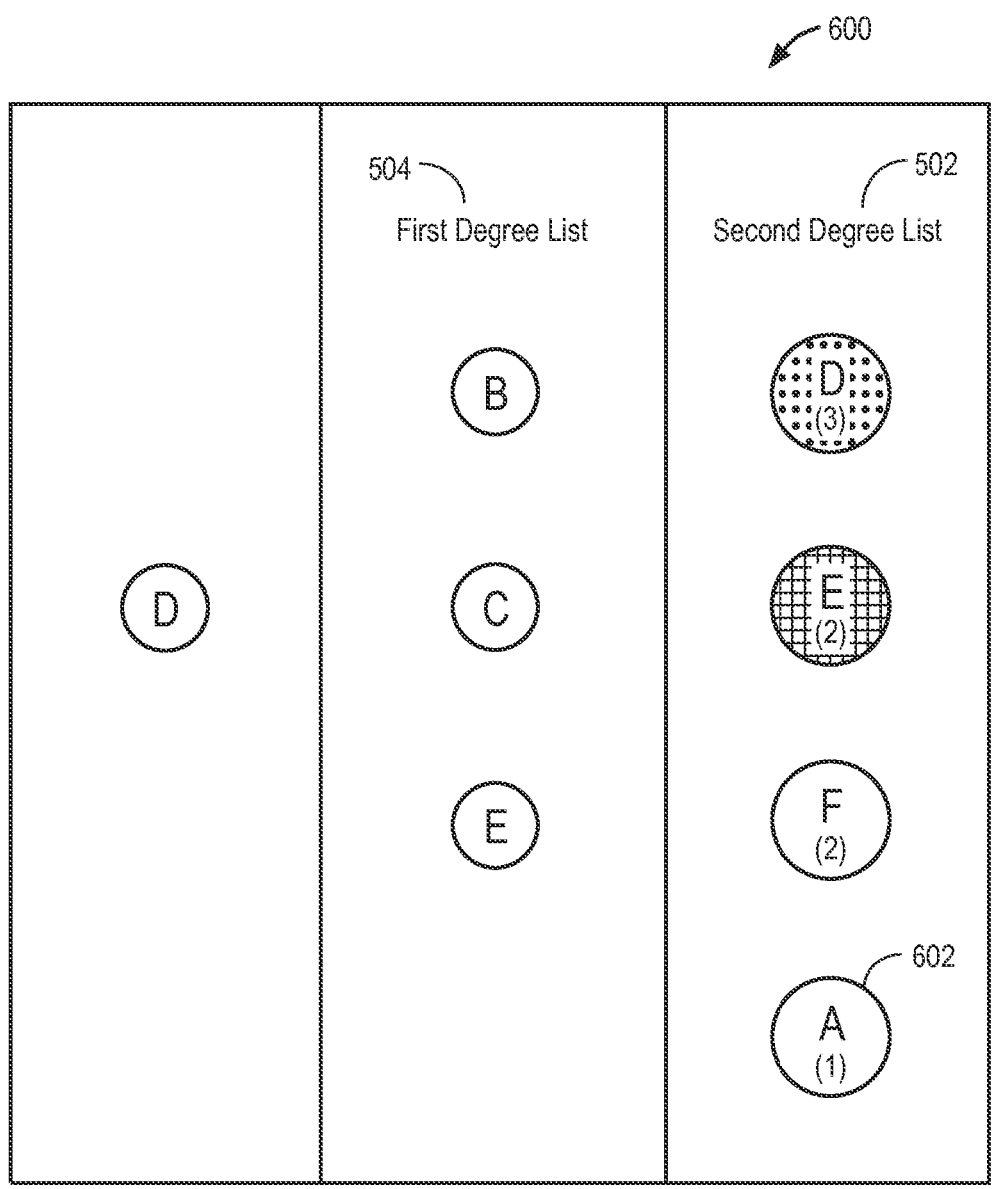
FIG. 6 is a diagram illustrating another partial graph in accordance with an example embodiment.

In order to address this issue, in an example embodiment, reference counting is used to count the number of paths reaching to each node/member 302A-G in a partial graph from the source vertex of the partial graph. FIG. 5 is a diagram illustrating a partial graph 500 having limited hops and reference counts in accordance with an example embodiment. This diagram shows a partial graph 500 for node D 302D that includes a second degree list 502 having reference counts. This partial graph 500 may be constructed from the original social graph 300 of FIG. 3. The partial graph 500 contains both a first degree list 504 and a second degree list 502. Notably, the first degree list 504 does not need a reference count. Only lists past the first degree list 504 (i.e., second degree lists 502 or higher) contain the reference count. Additionally, unlike the partial graph 400 of FIG. 4, partial graph 500 contains entries 506A, 506B for node D 302D and node E 302E. This is despite the fact that node D 302D is the vertex of this partial graph 500 and node E 302E is contained in the first degree list 504. This is done so that a reference count for these nodes 302D and 302E can be maintained. These nodes 302D and 302E may be specially marked so that a search algorithm can quickly identify that there are nodes 302D and 302E that may be ignored (here they are shown greyed out but, in some embodiments, a field, such as a flag, may be set for entries corresponding to the nodes 506A, 506B, in a data structure, such as a list, corresponding to the second degree list 502). Since they are still contained in the second degree list 502, however, it is possible for a deletion algorithm to utilize the reference counts when determining how to remove a subset of a partial graph 500 from a partial graph 500. Most of general graph traversal algorithms can detect these nodes, 302 D and 302 E when it process itself or first degree nodes. When an edge is added between two nodes 302A-G, such as between node E 302E and node A 302A in FIG. 3, the system 100 may first check to see whether node A 302A is in the second degree list 502 for node D 302D, since node E 302E is in the first degree list 504. Since the second degree list 502 does not contain node A 302A, then node A 302A can be added with a reference count of 1. FIG. 6 is a diagram illustrating another partial graph 600 in accordance with an example embodiment. Here, node A 602 has been added to the second degree list 502 as described in this paragraph.

Figure 7:
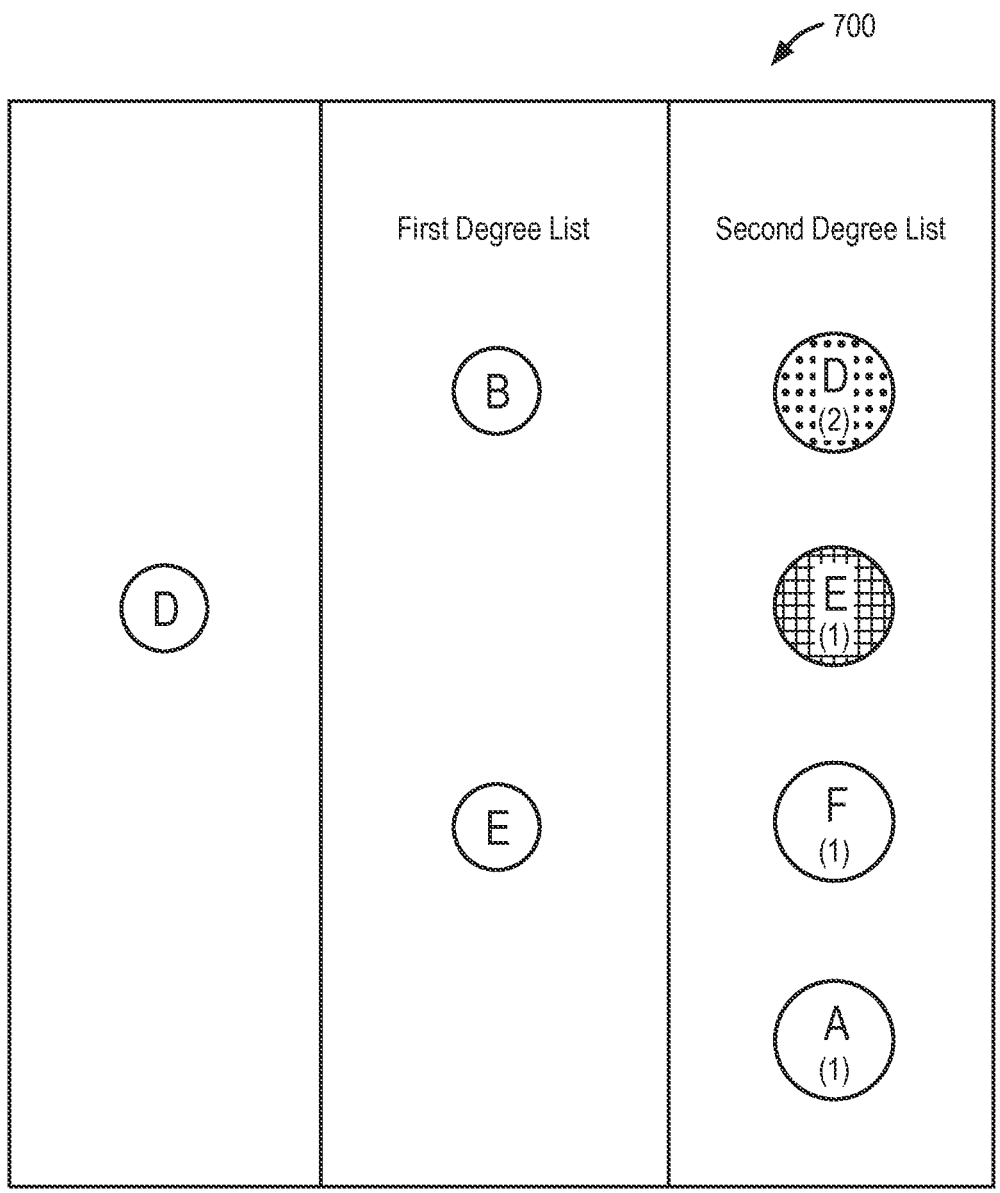
FIG. 7 is a diagram illustrating another partial graph in accordance with an example embodiment.

When an edge 304 A-J is deleted, such as the edge 304G between node D 302D and node C 302C, then node C 302C can be removed from node D 302D's first degree list 504. Then node C 302C's first degree list is retrieved, which contains node D 302D, node E 302E, and node F 302F, and this information can be used to "remove" an instance of each of node D 302D, node E 302E, and node F 302F from node D 302D's second degree list 502. This results in a decrement in the reference counts of nodes D 302D, node E 302E, and node F 302F from node D 302D's second degree list 502. FIG. 7 is a diagram illustrating another partial graph 700 in accordance with an example embodiment. Here, node C 302C has been removed from the first degree list and the reference counts for nodes D 302D, E 302E, and F 302F have been decremented by 1, as described in this paragraph.

Whenever edge deletion and addition events occur, the incremental update can identify which partial graph needs to be updated. In one example embodiment, this is performed by iterating over all vertices' partial graphs. This may, however, incur high overhead. In order to reduce this overhead, in another example embodiment, a global index is maintained that maps between vertices and inverted indices sets, which indicate which partial graphs contain the edges. Table 1 below is an example of such a global index for the social graph 300 of FIG. 3:

TABLE 1

| Vertices | Inverted Vertices Set |
|---|---|
| A | |
| B | AD |
| C | DF |
| D | BCE |
| E | ABCD |
| F | CB |

In the case of an addition of an edge 304A-J from node B 302B to node A 302A, the partial graph of node B 302B needs to be updated. Additionally, according to the global index in Table 1, nodes A 302A and D 302D's partial graphs should be updated since the addition should add node A 302A into node A 302A and D 302D's 2 hops lists.

In the case of a deletion of an edge 304A-J from node D 302D to node C 032C, the partial graph 700 of node D 302D should be updated. Additionally, according to the global index in Table 1, the partial graphs of nodes B 302B, C 302C, and E 302E should be updated.

The node deletion and node creation processes can be directly translated into a series of edge deletion and edge addition operations. The following is example pseudocode representing an example embodiment of such operations. For purposes of this pseudocode, the 1 hop set is labeled as First Degree Connections (FDC) while the 2 hop set is labeled as Second Degree Connections (SDC). The operations are as follows addSdc(partialGraph, destId): Increase the reference count of SDC map of partialGraph if partialGraph SDC map contains destId. Otherwise, initialize the reference count of destId with 1 in the map.

removeSdc(partialGraph, destId): Reduce the reference count of destId. Remove destId in the partialGraph's map if its reference count is zero.

addFdc(partialGraph, destId, destIdConnectionsSet) is shown in Algorithm 1.

---
Algorithm 1: addFdc operation

Goal: To add a vertex destID to FDC and all its connection in destIdConnectionsSet into SDC of the partialGraph.
1  foreach connection ϵ destIdConnectionsSet do
2  |  addSdC (partialGraph, connection)
3  end
4  partialGraph.fDC.add(destId)
--- removeFde is shown in Algorithm 2.

---
Algorithm 2: RemoveFdc operation

Goal: To remove a vertex destID to FDC and remove all its connections in destIdConnectionsSet into SDC of the partialGraph.
1  foreach connection ϵ destIdConnectionsSet do
2  |  removeSdC (partialGraph, connection)
3  end
4  partialGraph.fDC.remove(destId)
---

As to the graph incremental update as a whole, the following pseudocode represents an example embodiment of operations supported by the graph incremental update.

Edge addition operation: is shown in Algorithm 3. First add the edge into the graph and, at the same time, update the first degree partial graph of the source vertex and iterate through all the vertices in the inverted list to update the second degree connections of all the vertices whose first degree connections contain the sourceId. At the end, update the inverted list of destId.

Algorithm 3: Graph Incremental Update Add Edge Algorithm

Goal: Given edge with sourceId and destsId, update the key-PartialGraph store iuStore and invertedMap to add edge. Return true if graph updates. Otherwise return false.
1  if !iuStore.contains(sourceId) then
2  | Put <sourceId, emptyPartialGraph> to iuStore
3  end
4  sidPartialGraph = store.get(sourceId)
5  if destId ∈ sidPartialGraph.FDC then
6  | return false
7  end
8  addFdc(sidPartialGraph, destId, iuStore.get(destId).FDC)
9  if invertedMap.containsKey(sourceId) then
10 | sidInvertedList = invertedMap.get(sourceId)
11 | foreach partialGraph ∈ sidInvertedList do
12 | | addSdc(partialGraph, destId)
13 | end
14 end
15 if !invertedMap.containsKey(destId) then
16 | Put < destId, emptyList > into inverted Map
17 end
18 invertedMap.get(destId). add(sourceID)
19 return true Edge deletion operation: as shown in Algorithm 4: This is a reversion of the operation of edge addition with one edge removed.

Algorithm 4: Graph Incremental Update Remove Edge Algorithm

Figure 8:
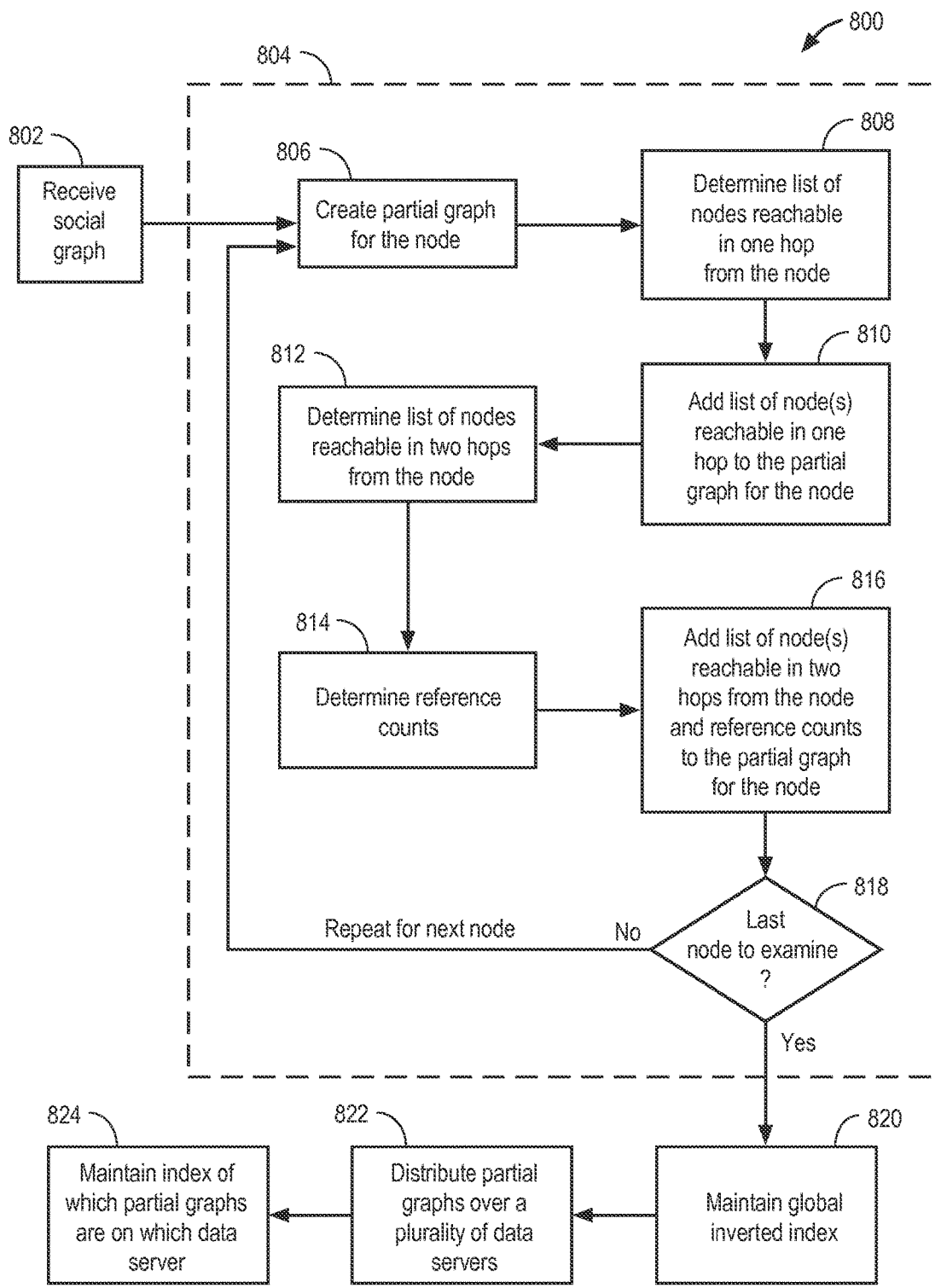
FIG. 8 is a flow diagram illustrating a method or distributing a social graph over a plurality of data servers in accordance with an example embodiment.

Goal: Given sourceId and destsId, update the key-PartialGraph store iuStore and invertedMap to remove edge. Return true if graph updates. Otherwise return false.
1  if !iuStore.contains(sourceId) then
2  | return false
3  end
4  sidPartialGraph = store.get(sourceId)
5  if destId ∉ sidPartialGraph.FDC then
6  | return false
7  end
8  removeFdc(sidPartialGraph, destId, iuStore.get(destId).FDC)
9  if invertedMap.containsKey(sourceId) then
10 | sidInvertedList = invertedMap.get(sourceId)
11 | foreach partialGraph ∈ sidInvertedList do
12 | | removeSdc(partialGraph, destId)
13 | end
14 end
15 invertedMap.get(destId).remove(sourceID)
16 return true FIG. 8 is a flow diagram illustrating a method 800 for distributing a social graph 300 over a plurality of data servers 202A-N in accordance with an example embodiment. This method may be performed at, for example, a central controller. At operation 802, a social graph 300 is received. As described earlier, the social graph 300 may include a plurality of nodes 302A-G and a plurality of edges 304A-J, each of the nodes 320A-G corresponding to a member in a social network service and each of the edges 304A-J representing a connection between members of the social network service.

A loop 804 is then begun for each of a plurality of nodes 302A-G in the social graph 300. At operation 806, a partial graph is created for the node 302A-G. At operation 808, a list of the nodes 302A-G reachable in one hop from the node 302A-G is determined. At operation 810, the list of nodes 302A-G reachable in one hop is added to a first degree list for the partial graph. At operation 812, a list of nodes 302A-G reachable in two hops from the node 302A-G is determined. At operation 814, reference counts as to how many paths exist between the node 302A-G and each node 302A-G reachable in two hops from the node 320A-G are determined. At operation 816, the list of nodes 302A-G and the reference counts are added to a second degree list for the partial graph. At operation 818, it is determined if this is the last node 302A-G to examine. If not, then the process repeats back to operation 806. If so, then the process proceeds to operation 820, wherein a global inverted index 212 is maintained. The global inverted index 212 may contain a list of all nodes 302A-G in the social graph 300 and, for each node 302A-G, a list of nodes 302A-G that directly connect to the node 302A-G. At operation 822, the partial graphs created for each of the plurality of nodes 302A-G are distributed across a plurality of data servers 202A-N. It should be noted that each data server 202A-N could potentially hold any number of partial graphs. At operation 824, an index of which partial graphs are stored on which data servers 202A-N is maintained.

Figure 9:
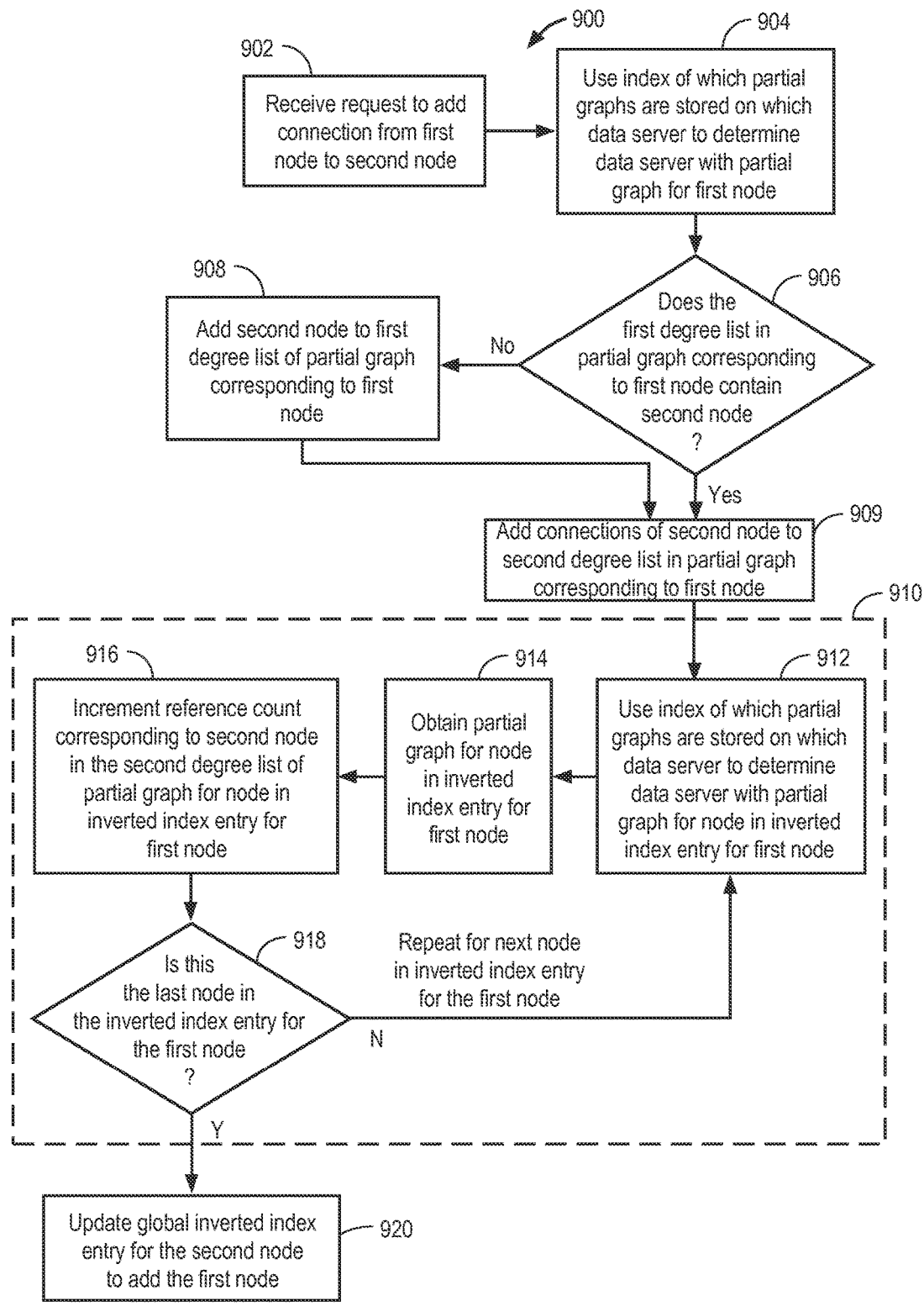
FIG. 9 is a flow diagram illustrating a method for adding a connection from a first node and a second node in a social graph in accordance with an example embodiment.

FIG. 9 is a flow diagram illustrating a method 900 for adding a connection from a first node and a second node in a social graph 300 in accordance with an example embodiment. This method may be performed at, for example, a central controller or using a combination of a central controller and logic at a data server 202A-N or data servers 202A-N storing a partial graph (or partial graphs) being modified. As described earlier, this method 900 assumes a unidirectional connection is being added and thus if a bidirectional connection is added between a first node and a second node the method should be performed twice, once in each direction, with each node 302A-G switching positions in the process. At operation 902, a request to add a connection from a first node to a second node in the social graph 300 is received. At operation 904, the index of which partial graphs are stored on which data servers 202A-N is used to determine a data server 202A-N storing a partial graph corresponding to the first node.

At operation 906, it is determined whether the first degree list in the partial graph corresponding to the first node contains the second node. If not, then at operation 908 the second node is added to the first degree list in the partial graph corresponding to the first node. Notably, however, in some example embodiments operations 906 and 908 may be omitted as the social graph service may not generate a case that would satisfy operation 908. Then, at operation 909 the connections of second node are added to the second degree list in the partial graph corresponding to the first node. A loop 910 is then begun for each node 302A-G that the global inverted index 212 lists as directly connecting to the first node. At operation 912, the index of which partial graphs are stored on which data servers 202A-N is used to determine a data server 202A-N storing a partial graph corresponding to the node 302A-G. At operation 914, the partial graph corresponding to the node 302A-G is obtained from the data server 202A-N storing the partial graph corresponding to the first node. At operation 916, a reference count corresponding to the second node in the second degree list in the partial graph corresponding to the node in the inverted index entry for the first node is incremented. At operation 918, it is determined if this is the last node in the inverted index entry for the first node. If not, the process loops back to operation 912. If so, then at operation 920, the global inverted index 212 is updated to add the first node to the list of nodes 302A-G that directly connect to the second node.

Figure 10:
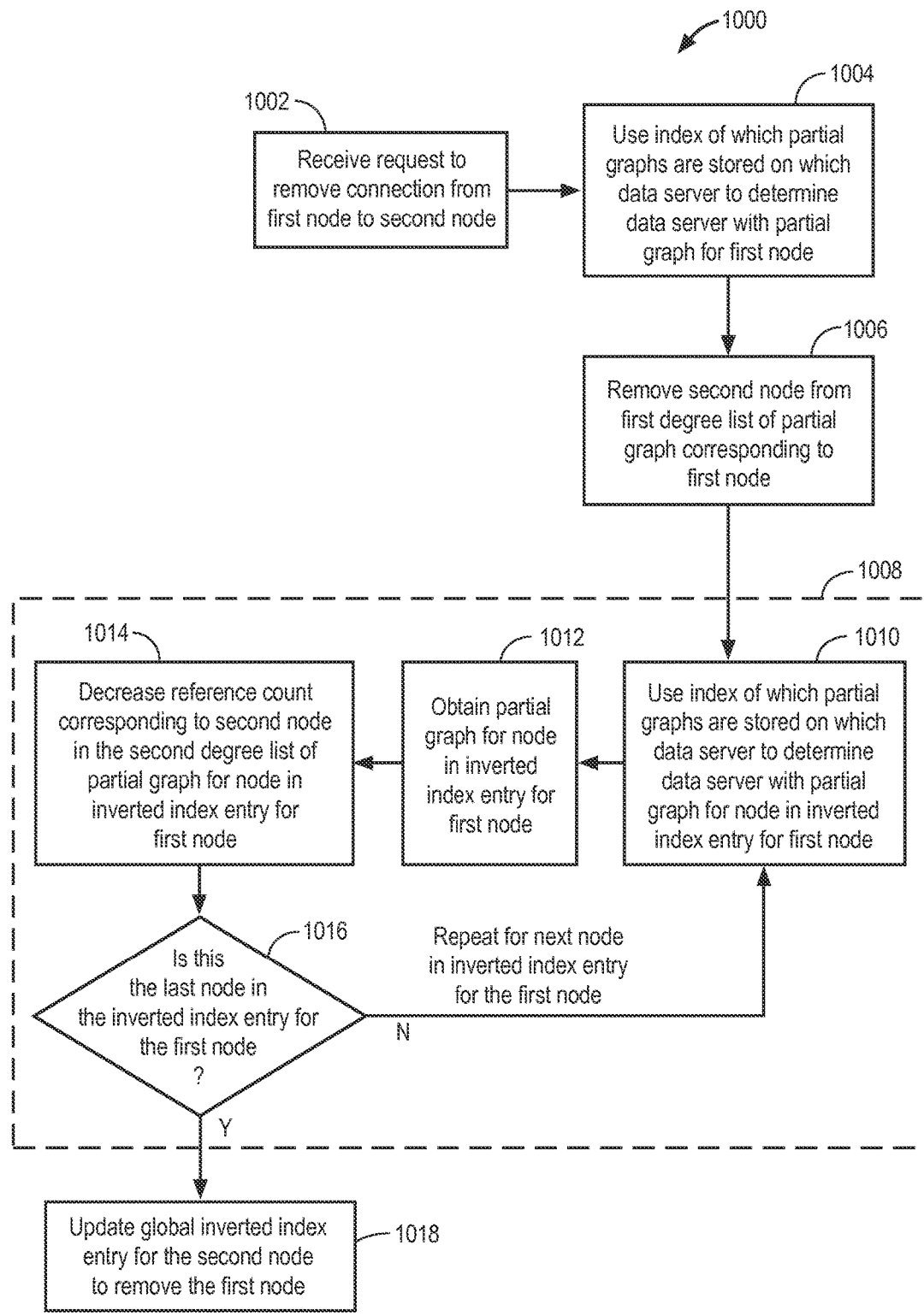
FIG. 10 is a flow diagram illustrating a method for deleting a connection from a first node and a second node in a social graph in accordance with an example embodiment.

FIG. 10 is a flow diagram illustrating a method 1000 for deleting a connection from a first node to a second node in a social graph 300 in accordance with an example embodiment. This method may be performed at, for example, a central controller or using a combination of a central controller and logic at a data server or data servers 202A-N storing a partial graph (or partial graphs) being modified. As described earlier, this method 1000 assumes a unidirectional connection is being deleted and thus if a bidirectional connection is deleted between a first node and a second node the method should be performed twice, once in each direction, with each node 302A-G switching positions in the process. At operation 1002, a request to delete a connection from a first node to a second node in the social graph 300 is received. At operation 1004, the index of which partial graphs are stored on which data servers 202A-N is used to determine a data server 202A-N storing a partial graph corresponding to the first node.

At operation 1006, the second node is deleted to the first degree list in the partial graph corresponding to the first node. Then, the connections of the second node are deleted to the second degree list in the partial graph corresponding to the first node. A loop 1008 is then begun for each node 302A-G that the global inverted index 212 lists as directly connecting to the first node. At operation 1010, the index of which partial graphs are stored on which data servers 202A-N is used to determine a data server 202A-N storing a partial graph corresponding to the node 302A-G in the inverted index entry for the first node. At operation 1012, the partial graph corresponding to the node 302A-G in the inverted index entry for the first node is obtained from the data server 202A-N storing the partial graph corresponding to that node. At operation 1014, a reference count corresponding to the second node in the second degree list in the partial graph corresponding to the node in the inverted index entry for the first node is decremented. At operation 1016, it is determined if this is the last node 302A-G in the inverted index entry for the first node. If not, the process repeats back to operation 1010 for the next node in the inverted index entry for the first node. If so, then at 1018, the global inverted index 212 is updated to remove the first node from the list of nodes that directly connect to the second node.

Figure 11:
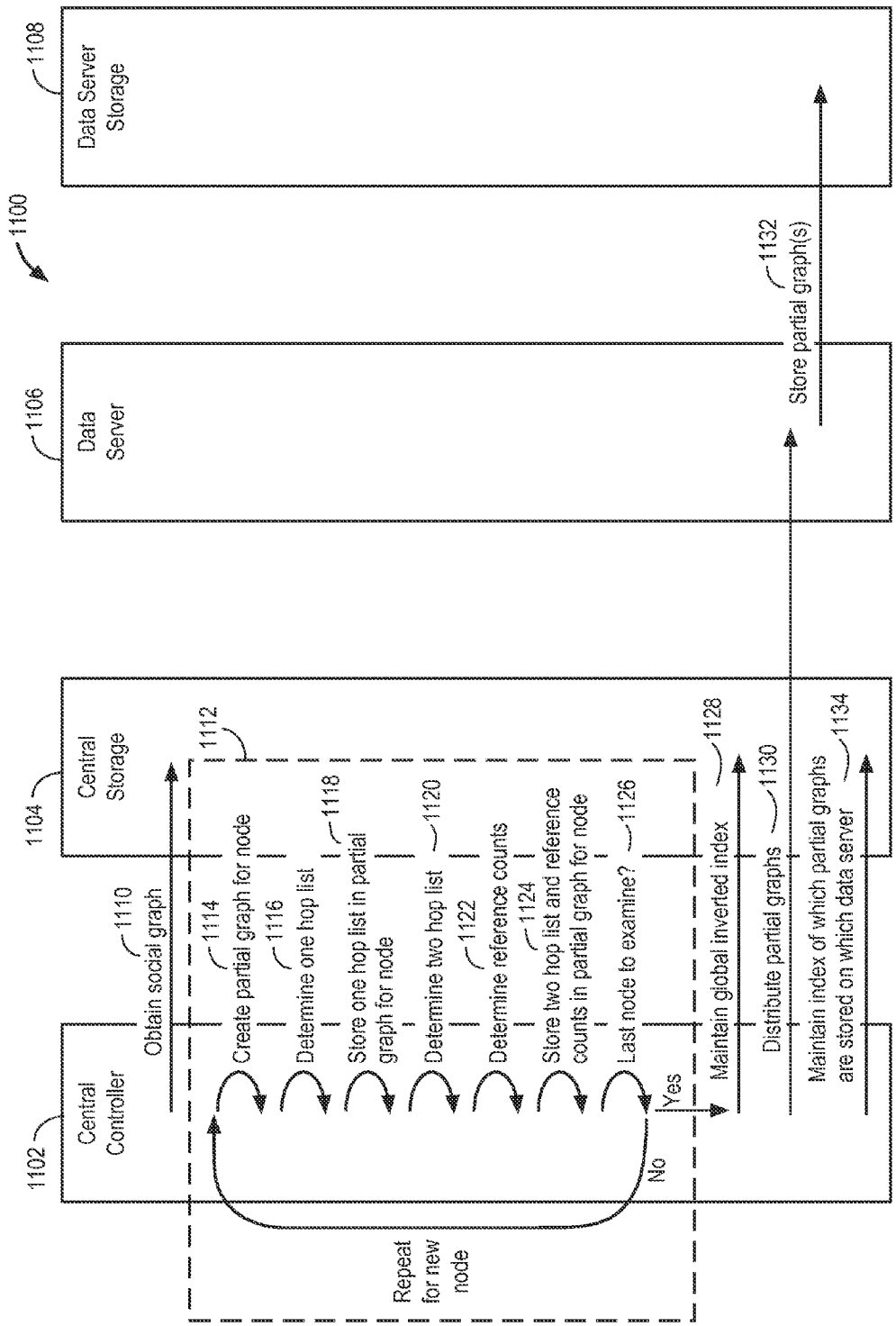
FIG. 11 is a sequence diagram illustrating a method for distributing a social graph over a plurality of data servers in accordance with an example embodiment.

FIG. 11 is a sequence diagram illustrating a method 1100 for distributing a social graph 300 over a plurality of data servers 202A-N in accordance with an example embodiment. This method may utilize a central controller 1102, a central storage 1104, at least one data server 1106, and at least one data server storage 1108. At operation 1110, a social graph 300 is obtained. As described earlier, the social graph 300 may include a plurality of nodes 302A-G and a plurality of edges 302A-J, each of the nodes 302A-G corresponding to a member in a social network service and each of the edges 302A-J representing a connection between members of the social network service.

A loop 1112 is then begun for each of a plurality of nodes 302A-G in the social graph 300. At operation 1114, a partial graph is created for the node 302A-G. At operation 1116, a list of the nodes reachable in one hop from the node 302A-G is determined. At operation 1118, the list of nodes reachable in one hop is added to a first degree list for the partial graph for the node 302A-G. At operation 1120, a list of nodes 302A-G reachable in two hops from the node 302A-G is determined. At operation 1122, reference counts as to how many paths exist between the node 302A-G and each node 302A-G reachable in two hops from the node 302A-G are determined. At operation 1124, the list of nodes 302A-G and the reference counts are added to a second degree list for the partial graph for the node. At operation 1126, it is determined if this is the last node 302A-G to examine. If not, then the process repeats back to operation 1114. If so, then the process proceeds to operation 1128, wherein a global inverted index 212 is maintained in the central storage 1104. The global inverted index 212 may contain a list of all nodes 302A-G in the social graph 300 and, for each node 302A-G, a list of nodes 302A-G that directly connect to the node 302A-G. At operation 1130, the partial graphs created for each of the plurality of nodes 302A-G and inverted index are distributed across a plurality of data servers, such as data server 1106. Each data server 1106 stores the partial graph(s) in its corresponding data server storage 1108 at operation 1132. It should be noted that each data server 1106 could potentially hold any number of partial graphs. At operation 1134, an index of which partial graphs are stored on which data servers 1106 is maintained in the central storage 1104.

Figure 12:
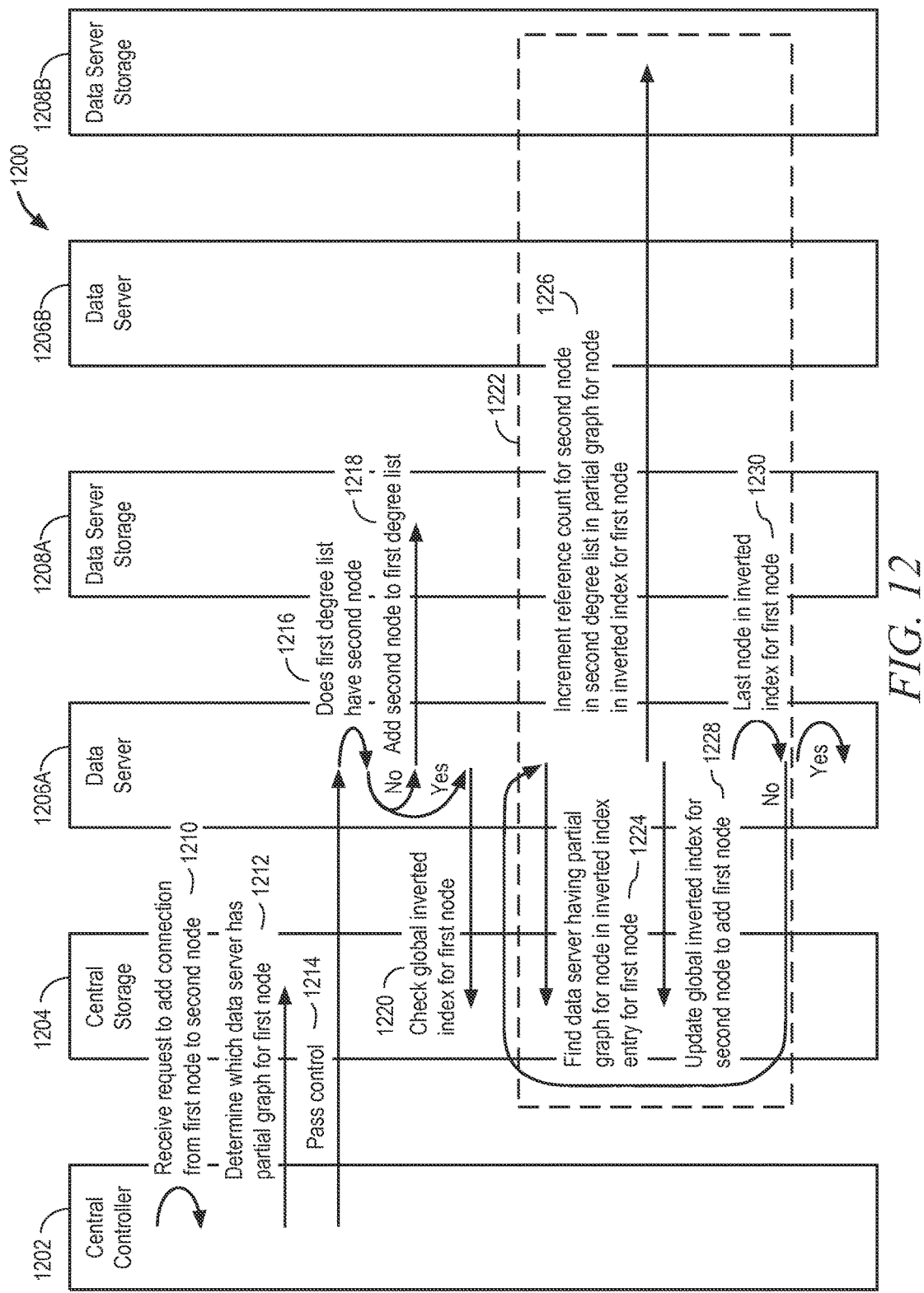
FIG. 12 is a sequence diagram illustrating a method for adding a connection from a first node and a second node in a social graph in accordance with an example embodiment.

FIG. 12 is a sequence diagram illustrating a method 1200 for adding a connection from a first node and a second node in a social graph 300 in accordance with an example embodiment. This method may utilize a central controller 1202, a central storage 1204, at least two data servers 1206A, 1206B, and at least two data server storages 1208A, 1208B. As described earlier, this method 1200 assumes a unidirectional connection is being added and thus if a bidirectional connection is added between a first node and a second node the method should be performed twice, once in each direction, with each node switching positions in the process. At operation 1210, a request to add a connection from a first node to a second node in the social graph 300 is received. At operation 1212, the index of which partial graphs are stored on which data servers 1206A, 1206B is used to determine a data server 1206A. 1206B storing a partial graph corresponding to the first node. At operation 1214, control is then passed to the data server (here data server 1206A) storing the partial graph corresponding to the first node.

At operation 1216, it is determined whether the first degree list in the partial graph corresponding to the first node (stored in data server storage 1208A) contains the second node. If not, then at operation 1218 the second node is added to the first degree list in the partial graph corresponding to the first node. Notably, however, in some example embodiments operations 1216 and 1218 may be omitted as the social graph service may not generate a case that would satisfy operation 1218. The connections of the second node are added to the second degree list in the partial graph (not pictured). The global inverted index 212 stored in the central storage 1204 is then checked at operation 1220. A loop 1222 is then begun for each node 302A-G that the global inverted index 212 lists as directly connecting to the first node. At operation 1224, the index of which partial graphs are stored on which data servers 1206A, 1206B is used to determine another data server (here data server 1206B) storing a partial graph corresponding to the nodes directly connected to the first node. At operation 1226, a reference count corresponding to the second node in the second degree list in the partial graph (stored in data server storage 1208B) corresponding to the node 302A-G in the inverted index for the first node is incremented. At operation 1228, the global inverted index 212 in the central storage 1204 is updated to add the first node to the list of nodes 302A-G that directly connect to the second node. At operation 1230, it is determined if this is the last node in the inverted index entry for the first node. If not, then the process loops back to operation 1224. If so, the process ends.

Figure 13:
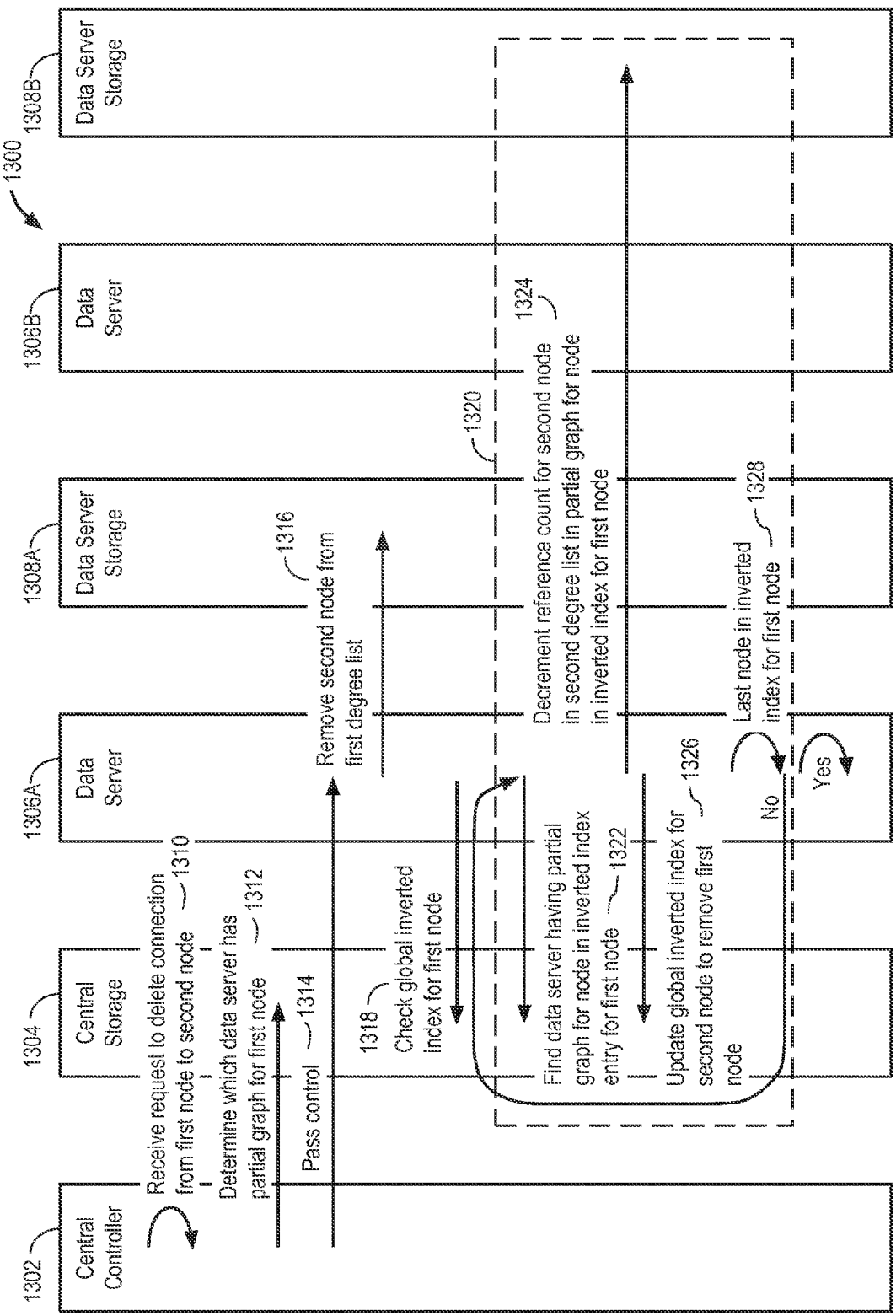
FIG. 13 is a sequence diagram illustrating a method for deleting a connection from a first node and a second node in a social graph in accordance with an example embodiment.

FIG. 13 is a sequence diagram illustrating a method 1300 for deleting a connection from a first node and a second node in a social graph 300 in accordance with an example embodiment. This method 1300 may utilize a central controller 1302, a central storage 1304, at least two data servers 1306A, 1306B, and at least two data server storages 1308A, 1308B. As described earlier, this method 1300 assumes a unidirectional connection is being deleted and thus if a bidirectional connection is deleted between a first node and a second node the method should be performed twice, once in each direction, with each node 302A-G switching positions in the process. At operation 1310, a request to delete a connection from a first node to a second node in the social graph 300 is received. At operation 1312, the index of which partial graphs are stored on which data servers 1306A, 1306B is used to determine a data server 1306A, 1306B storing a partial graph corresponding to the first node. At operation 1314, control is then passed to the data server (here data server 1306A) storing the partial graph corresponding to the first node.

At operation 1316 the second node is removed from the first degree list in the partial graph corresponding to the first node. Then, the connections of second node are removed from the second degree list in the partial graph corresponding to the first node (not pictured). The global inverted index 212 stored in the central storage 1304 is then checked at operation 1318. A loop 1320 is then begun for each node 302A-G that the global inverted index 212 lists as directly connecting to the first node. At operation 1322, the index of which partial graphs are stored on which data servers 1306A, 1306B is used to determine another data server (here data server 1306B) storing a partial graph corresponding to the node 302A-G. At operation 1324, a reference count corresponding to the second node in the second degree list in the partial graph (stored in data server storage 1308B) corresponding to the node 302A-G is decremented. At operation 1326, the global inverted index 212 in the central storage 1304 is updated to add the first node to the list of nodes that directly connect to the second node. At operation 1328, it is determined if this is the last node in the inverted index entry for the first node. If not, then the process loops back to operation 1224. If so, the process ends.

Alternate Partial Graph Storage

Figure 14:
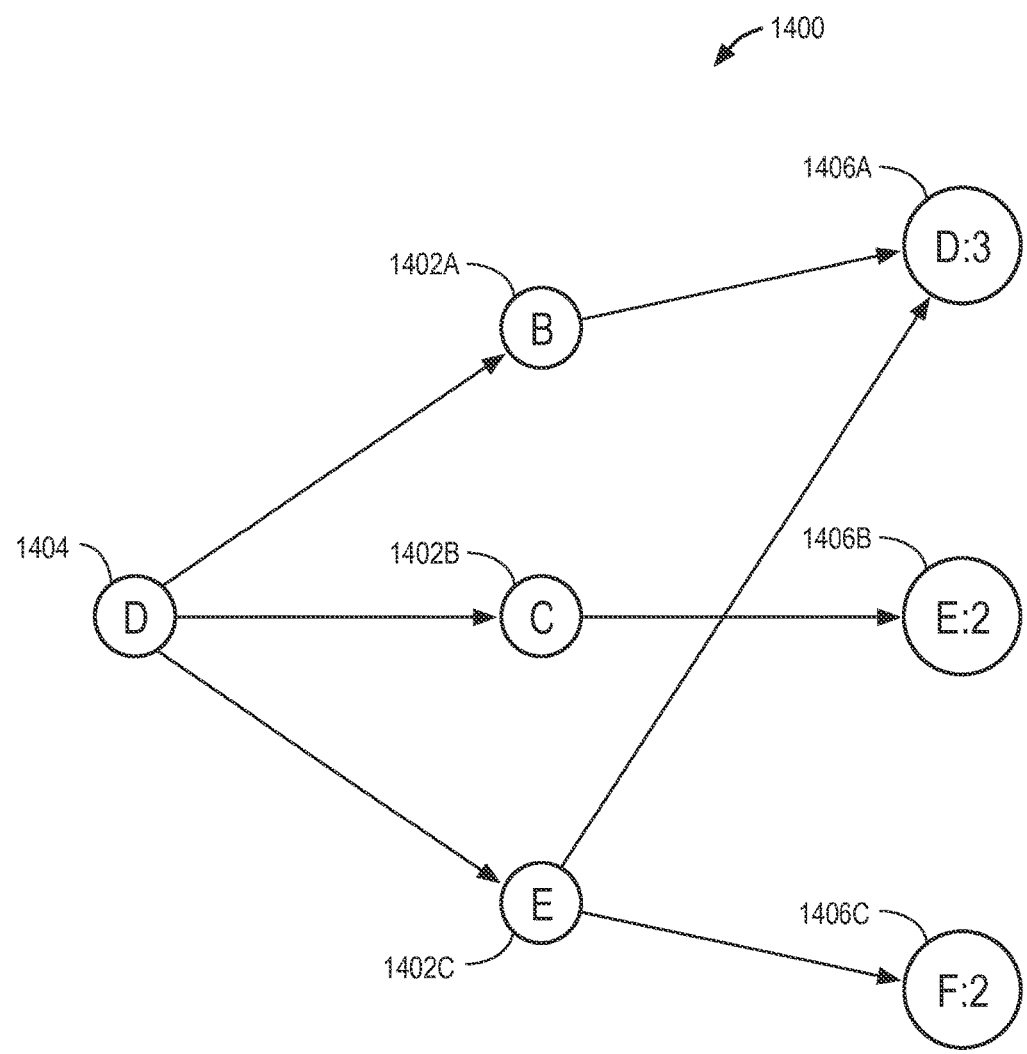
FIG. 14 is an example of a partial graph storing reference counts in accordance with an example embodiment.

While the above description depicts the information in the first degree list and the second degree list (including the reference counts) as being stored in lists associated with (or in) the partial graphs for each vertex, in some example embodiments, this information may be actually stored in the partial graph itself as nodes in the partial graph with the reference counts being information stored in the nodes. FIG. 14 is an example of a partial graph 1400 storing reference counts in accordance with an example embodiment. The partial graph 1400 represents another way of storing the partial graph 500 of FIG. 5. As can be seen, the first degree list 504 is represented as a series of nodes 1402A-1402C simply being one hop away from node D 1404 in this partial graph 1400. Likewise, the second degree list 502 is represented as a series of nodes 1406A-1406C simply being two hops away from node D 1404 in this partial graph 1400. Nodes 1406A-1406C each store a reference count.

Additionally, while the above description discusses how the adding and deletion of connections is based on a central storage. However, in some example embodiments no central storage may be used and instead the partial graph could be distributed, with a local index and an inverted index. In this case, the edge change event can be broadcast to all servers. Each server can then locate the first node in the first degree list. Thus, it can also update the second degree list with the second node.

Example Mobile Device

Figure 15:
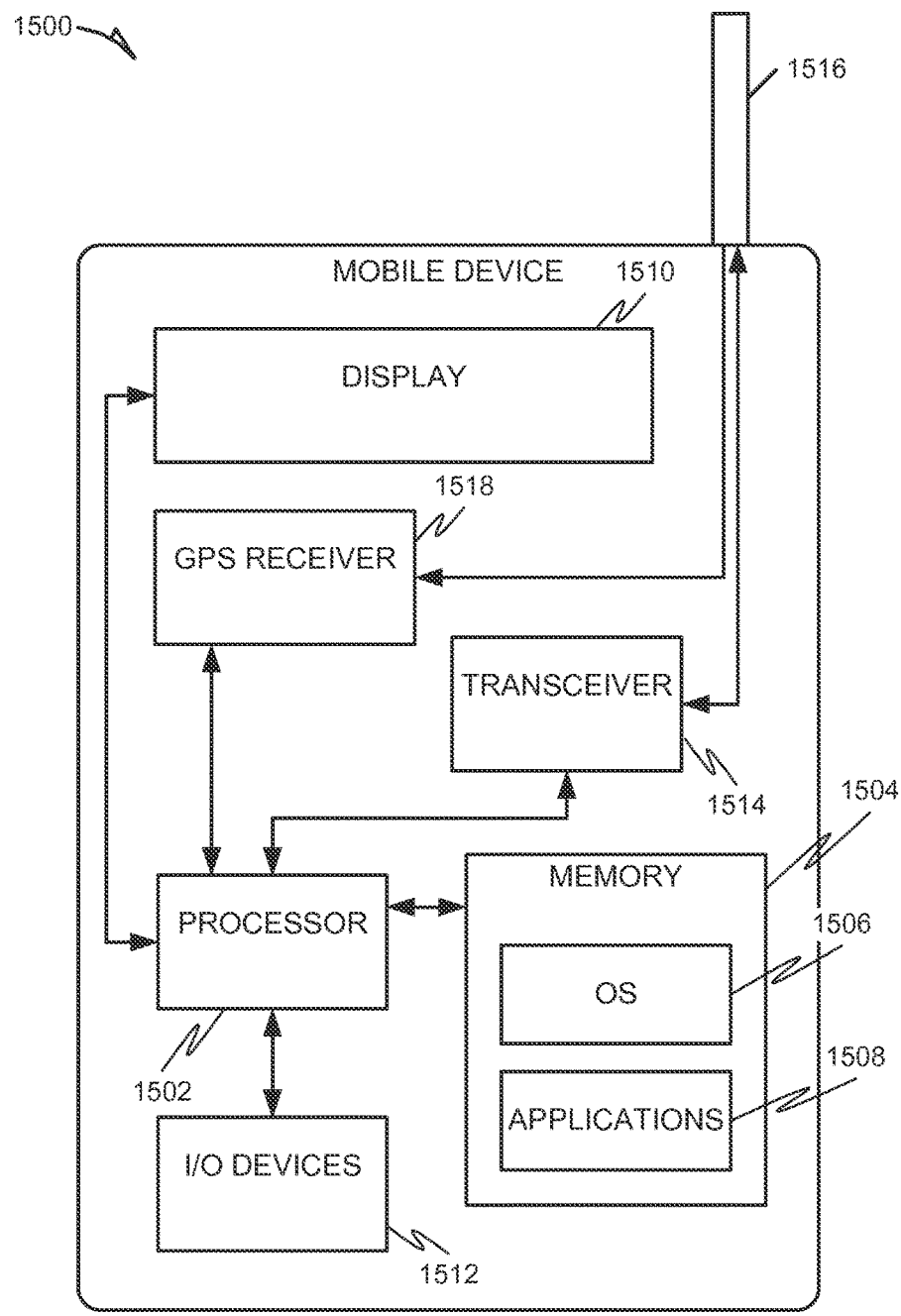
FIG. 15 is a block diagram illustrating a mobile device, according to an example embodiment.

FIG. 15 is a block diagram illustrating a mobile device 1500, according to an example embodiment. The mobile device 1500 can include a processor 1502. The processor 1502 can be any of a variety of different types of commercially available processors 1502 suitable for mobile devices 1500 (for example, an XScale architecture microprocessor, a microprocessor without interlocked pipeline stages (MIPS) architecture processor, or another type of processor 1502). A memory 1504, such as a random access memory (RAM), a flash memory, or another type of memory, is typically accessible to the processor 1502. The memory 1504 can be adapted to store an operating system (OS) 1506, as well as application programs 1508. The processor 1502 can be coupled, either directly or via appropriate intermediary hardware, to a display 1510 and to one or more input/output (I/O) devices 1512, such as a keypad, a touch panel sensor, a microphone, and the like. Similarly, in some embodiments, the processor 1502 can be coupled to a transceiver 1514 that interfaces with an antenna 1516. The transceiver 1514 can be configured to both transmit and receive cellular network signals, wireless data signals, or other types of signals via the antenna 1516, depending on the nature of the mobile device 1500. Further, in some configurations, a GPS receiver 1518 can also make use of the antenna 1516 to receive GPS signals.

Modules, Components, and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors 1502 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 1502 or other programmable processor 1502) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1502 configured using software, the general-purpose processor 1502 can be configured as different hardware-implemented modules at different times. Software can accordingly configure a processor 1502, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 1502 that are temporarily configured (e.g., by software) or permanently configured to perform the relevant operations. Whether temporarily or permanently configured, such processors 1502 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors 1502 or processor-implemented modules. The performance of certain of the operations can be distributed among the one or more processors 1502, not only residing within a single machine, but deployed across a number of machines. In some example embodiments, the processor 1502 or processors 1502 can be located in a single location (e.g., within a home environment, an office environment, or a server farm), while in other embodiments, the processors 1502 can be distributed across a number of locations.

The one or more processors 1502 can also operate to support performance of the relevant operations in a "cloud computing" environment or as a "software as a service" (SaaS). For example, at least some of the operations can be performed by a group of computers (as examples of machines including processors 1502), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 1502, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 1502 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 1502), or in a combination of permanently and temporarily configured hardware can be a design choice. Below are set out hardware (e.g., machine) and software architectures that can be deployed, in various example embodiments.

Example Machine Architecture and Machine-Readable Medium

Figure 16:
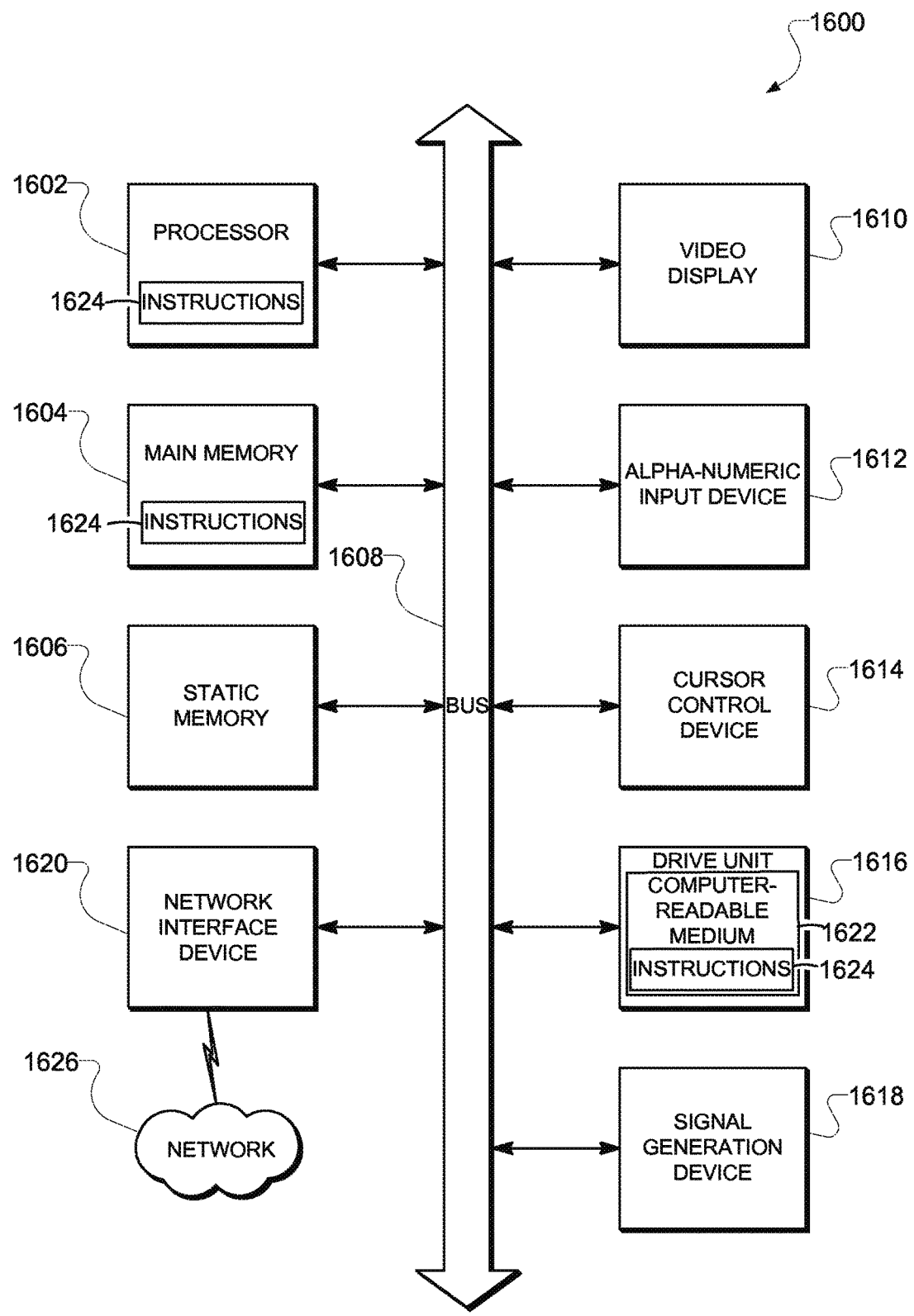
FIG. 16 is a block diagram of machine in the example form of a computer system within which instructions, for causing the machine to perform any one or more of the methodologies discussed herein, can be executed.

FIG. 16 is a block diagram of machine in the example form of a computer system 1600 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a CPU, a graphics processing unit (GPU), or both), a main memory 1604 and a static memory 1606, which communicate with each other via a bus 1608. The computer system 1600 can further include a video display 1610 (e.g., a liquid crystal display (LCD) or a cathode ray tube (CRT)). The computer system 1600 also includes an alphanumeric input device 1612 (e.g., a keyboard or a touch-sensitive display screen), a cursor control device 1614 (e.g., a mouse), a drive unit 1616, a signal generation device 1618 (e.g., a speaker), and a network interface device 1620.

Machine-Readable Medium

The drive unit 1616 includes a machine-readable medium 1622 on which is stored one or more sets of instructions (e.g., software) 1624 embodying or utilized by any one or more of the methodologies or functions described herein. The instructions 1624 can also reside, completely or at least partially, within the main memory 1604 and/or within the processor 1602 during execution thereof by the computer system 1600, the main memory 1604 and the processor 1602 also constituting machine-readable media 1622.

While the machine-readable medium 1622 is shown in an example embodiment to be a single medium, the term "machine-readable medium" can include a single medium or multiple media (e.g., a centralized or distributed database, and/or associated caches and servers) that store the one or more instructions 1624 or data structures. The term "machine-readable medium" shall also be taken to include any tangible medium that is capable of storing, encoding, or carrying instructions 1624 for execution by the machine and that cause the machine to perform any one or more of the methodologies of the present disclosure, or that is capable of storing, encoding, or carrying data structures utilized by or associated with such instructions 1624. The term "machine-readable medium" shall accordingly be taken to include, but not be limited to, solid-state memories, and optical and magnetic media. Specific examples of machine-readable media 1622 include non-volatile memory including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1624 can further be transmitted or received over a communications network 1626 using a transmission medium. The instructions 1624 can be transmitted using the network interface device 1620 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1624 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    retrieving a social graph including a plurality of nodes and a plurality of edges, each of the nodes corresponding to a member in a social network service and each of the edges representing a connection between members of the social network service;
    for each node of the plurality of nodes in the social graph:
    creating a vertex-centric partial graph for the node, the vertex-centric partial graph identifying the node as a vertex with a specific vertex node and containing nodes from the partial graph, the nodes from the partial graph being only nodes reachable within limited hops from the node, wherein a hop is a distance of one edge between nodes;
        determining a list of the nodes reachable in one hop, without intermediate nodes, from the vertex;
        adding the list of nodes reachable in one hop to a first degree list for the partial graph;
        determining a list of nodes reachable in exactly two hops from the vertex, and reference counts as to how many distinct paths exist, in the social graph, between the vertex and each of the nodes reachable in exactly two hops from the vertex; and
        adding the list of nodes reachable in two hops and the reference counts to a second degree list for the partial graph;
    maintaining a global inverted index containing a list of all nodes in the social graph and for each node in the social graph a list of nodes that directly connect to the node in the social graph;
    distributing the partial graphs created for each of the plurality of nodes across a plurality of data servers; and
    distributing the global inverted index containing the list of all directly connected nodes to the data servers to facilitate a network computer breadth-first distance traversal.

2. The computer-implemented method of claim 1, further comprising:
receiving a request to add a connection from a first node to a second node in the social graph;
using the index of which partial graphs are stored on which data servers to determine a data server storing a partial graph corresponding to the first node;
obtaining the partial graph corresponding to the first node from the data server storing the partial graph corresponding to the first node;
determining whether the first degree list in the partial graph corresponding to the first node contains the second node;
in response to a determination that the first degree list in the partial graph corresponding to the first node does not contain the second node, adding the second node to the first degree list in the partial graph corresponding to the first node;
for each node that the global inverted index lists as directly connecting to the first node:
using the index of which partial graphs are stored on which data servers to determine a data server storing a partial graph corresponding to the node that the global inverted index lists;
obtaining the partial graph corresponding to the node from the data server storing the partial graph corresponding to the node; and
incrementing a reference count corresponding to the second node in the second degree list for the partial graph corresponding to the node; and
updating the global inverted index to add the first node to the list of nodes that directly connect to the second node.

3. The computer-implemented method of claim 1, further comprising:
receiving a request to delete a connection from a first node to a second node in the social graph;
using the index of which partial graphs are stored on which data servers to determine a data server storing a partial graph corresponding to the first node;
obtaining the partial graph corresponding to the first node from the data server storing the partial graph corresponding to the first node;
removing the second node from the first degree list in the partial graph corresponding to the first node;
for each node that the global inverted index lists as directly connecting to the first node:
using the index of which partial graphs are stored on which data servers to determine the data server storing the partial graph corresponding to the node in the social graph;
obtaining the partial graph corresponding to the node from the data server storing the partial graph corresponding to the node;
decrementing a reference count corresponding to the second node in the second degree list for the partial graph corresponding to the node; and
updating the global inverted index to remove the first node from the list of nodes that directly connect to the second node.

4. The computer-implemented method of claim 1, wherein the second degree list for the partial graph corresponding to a node in the social graph contains the node in the social graph.

5. The computer-implemented method of claim 1, wherein each of the plurality of data servers stores more than one partial graph.

6. The computer-implemented method of claim 1, wherein the global inverted index is stored on each of the plurality of data servers.

7. The computer-implemented method of claim 1, wherein the global inverted index is stored on a central controller.

8. A data server comprising:
a content store containing one or more vertex-centric partial graphs, each vertex-centric partial graph corresponding to a different node in a social graph, identifying the node as a vertex with a specific vertex node identifier, and containing nodes from the partial graph that are only reachable within limited hops from the node, the social graph including a plurality of nodes and a plurality of edges, each of the nodes corresponding to a member in a social network service and each of the edges representing a connection between members of the social network service, the partial graph for a particular node including a first degree list of the nodes reachable in one hop, without intermediate nodes, from the particular node and also including a second degree list of nodes reachable in exactly two hopes from the particular node, as well as reference counts as to how many distinct paths exist, in the social graph, between the particular node and each node reachable in two hops from the node; and
a logic component comprising one or more processors configured to alter the one or more partial graphs stored in the content store, including the first degree lists, second degree lists, and reference counts, in response to the addition or deletion of a connection from a first node in the social graph to a second node; and
cause the altering of an inverted index entry corresponding the first node in a global inverted index, the global inverted index being distributed to data servers to facilitate a network computer breadth-first distance traversal.

9. The data server of claim 8, wherein the logic component is further configured to:
based on additional nodes in the social graph contained in an entry corresponding to the first node in the global inverted index, obtain locations of one or more additional data servers storing partial graphs pertaining to the additional nodes and pass instructions to alter the partial graphs pertaining to the additional nodes to the one or more additional data servers.

10. The data server of claim 8, wherein the altering of the one or more partial graphs includes, in response to a request to add a connection from the first node to the second node:
obtaining the partial graph corresponding to the first node;
determining whether the first degree list in the partial graph corresponding to the first node contains the second node;
in response to a determination that the first degree list in the partial graph corresponding to the first node does not contain the second node, adding the second node to the first degree list in the partial graph corresponding to the first node.

11. The data server of claim 9, wherein the instructions include instruction to:
for each node that the global inverted index lists as directly connecting to the first node:
obtain the partial graph corresponding to the node contained in the inverted index entry corresponding to the first node; and
increment the reference count corresponding to the second node in the second degree list in the partial graph corresponding to the node contained in the inverted index entry corresponding to the first node.

12. The data server of claim 8, wherein the altering of the one or more partial graphs includes, in response to a request to delete the connection from the first node to the second node:
   obtaining the partial graph corresponding to the first node; and
   remove the second node to the first degree list in the partial graph corresponding to the first node.

13. The data server of claim 9, wherein the instructions include instruction to:
   for each node that the global inverted index lists as directly connecting to the first node:
   obtain the partial graph corresponding to the node contained in the inverted index entry corresponding to the first node; and
   decrement the reference count corresponding to the second node in the second degree list for the partial graph corresponding to the node contained in the inverted index entry corresponding to the first node.

14. A non-transitory computer-readable medium storing executable instructions thereon, which, when executed by a processor, causes the processor to perform operations comprising:
   retrieving a social graph including a plurality of nodes and a plurality of edges, each of the nodes corresponding to a member in a social network service and each of the edges representing a connection between members of the social network service;
   for each node of the plurality of nodes in the social graph:
   creating a vertex-centric partial graph for the node, the vertex-centric partial graph identifying the node as a vertex with a specific vertex node and containing nodes from the partial graph, the nodes from the partial graph being only nodes reachable within limited hops from the node, wherein a hop is a distance of one edge between nodes;
   determining a list of the nodes reachable in one hop, without intermediate nodes, from the vertex;
   adding the list of nodes reachable in one hop to a first degree list for the partial graph;
   determining a list of nodes reachable in exactly two hops from the vertex, and reference counts as to how many distinct paths exist, in the social graph, between the vertex and each of the nodes reachable in exactly two hops from the vertex; and
   adding the list of nodes reachable in two hops and the reference counts to a second degree list for the partial graph;
   maintaining a global inverted index containing a list of all nodes in the social graph and for each node in the social graph a list of nodes that directly connect to the node in the social graph;
   distributing the partial graphs created for each of the plurality of nodes across a plurality of data servers; and
   distributing the global inverted index containing the list of all directly connected nodes to the data servers to facilitate a network computer breadth-first distance traversal.

15. The non-transitory computer-readable medium of claim 14, wherein the operations further comprise:
   receiving a request to add a connection from a first node to a second node in the social graph;
   using the index of which partial graphs are stored on which data servers to determine the data server storing the partial graph corresponding to the first node;
   obtaining the partial graph corresponding to the first node from the data server storing the partial graph corresponding to the first node;
   determining whether the first degree list in the partial graph corresponding to the first node contains the second node;
   in response to a determination that the first degree list in the partial graph corresponding to the first node does not contain the second node, adding the second node to the first degree list in the partial graph corresponding to the first node;
   for each node that the global inverted index lists as directly connecting to the first node:
   using the index of which partial graphs are stored on which data servers to determine the data server storing the partial graph corresponding to the node;
   obtaining the partial graph corresponding to the node from the data server storing the partial graph corresponding to the node; and
   incrementing a reference count corresponding to the second node in the second degree list for the partial graph corresponding to the node; and
   updating the global inverted index to add the first node to the list of nodes that directly connect to the second node.

16. The non-transitory computer-readable medium of claim 14, wherein the operations further comprise:
   receiving a request to delete a connection from a first node to a second node in the social graph;
   using the index of which partial graphs are stored on which data servers to determine a data server storing a partial graph corresponding to the first node;
   obtaining the partial graph corresponding to the first node from the data server storing the partial graph corresponding to the first node;
   removing the second node from the first degree list in the partial graph corresponding to the first node;
   for each node that the global inverted index lists as directly connecting to the first node:
   using the index of which partial graphs are stored on which data servers to determine a data server storing a partial graph corresponding to the node;
   obtaining the partial graph corresponding to the node from the data server storing the partial graph corresponding to the node;
   decrementing the reference count corresponding to the second node in the second degree list in the partial graph corresponding to the node; and
   updating the global inverted index to remove the first node to the list of nodes that directly connect to the second node.

17. The non-transitory computer-readable medium of claim 14, wherein the second degree list for the partial graph corresponding to the node contains the node.

18. The non-transitory computer-readable medium of claim 14, wherein each of the plurality of data servers stores more than one partial graph.

19. The non-transitory computer-readable medium of claim 14, wherein the global inverted index is stored on each of the plurality of data servers.

20. The non-transitory computer-readable medium of claim 14, wherein the global inverted index is stored on a central controller.

* * * * *

UNITED STATES PATENT AND TRADEMARK OFFICE
CERTIFICATE OF CORRECTION

PATENT NO. : 9,892,210 B2
APPLICATION NO. : 14/546790
DATED : February 13, 2018
INVENTOR(S) : Cho et al.

It is certified that error appears in the above-identified patent and that said Letters Patent is hereby corrected as shown below:

In the Claims

In Column 20, Line 39, in Claim 1, before "partial", delete "vertex-centric"

In Column 20, Lines 39-45, in Claim 1, delete "the vertex-centric partial graph identifying the node as a vertex with a specific vertex node and containing nodes from the partial graph, the nodes from the partial graph being only nodes reachable within limited hops from the node, wherein a hop is a distance of one edge between nodes;" and insert --thus identifying the node as a vertex;-- therefor In Column 20, Line 47, in Claim 1, delete "vertex;" and insert --vertex, wherein a hop is a distance of one edge between nodes;-- therefor In Column 20, Lines 64-67, in Claim 1, delete "distributing the global inverted index containing the list of all directly connected nodes to the data servers to facilitate a network computer breadth-first distance traversal." and insert --maintaining an index of which partial graphs are stored on which data servers.-- therefor In Column 22, Line 8, in Claim 8, before "partial graphs,", delete "vertex-centric"

In Column 22, Line 9, in Claim 8, before "partial graph", delete "vertex-centric"

In Column 22, Lines 10-14, in Claim 8, after "social graph,", delete "identifying the node as a vertex with a specific vertex node identifier, and containing nodes from the partial graph that are only reachable within limited hops from the node,"

In Column 22, Lines 34-37, in Claim 8, delete "index, the global inverted index being distributed to data servers to facilitate a network computer breadth-first distance traversal." and insert --index.-- therefor Signed and Sealed this
Ninth Day of July, 2019

Andrei Iancu
*Director of the United States Patent and Trademark Office*

In Column 23, Line 32, in Claim 14, before "partial graph", delete "vertex-centric"

In Column 23, Lines 32-38, in Claim 14, delete "the vertex-centric partial graph identifying the node as a vertex with a specific vertex node and containing nodes from the partial graph, the nodes from the partial graph being only nodes reachable within limited hops from the node, wherein a hop is a distance of one edge between nodes;" and insert --thus identifying the node as a vertex;-- therefor In Column 23, Line 40, in Claim 14, delete "vertex;" and insert --vertex, wherein a hop is a distance of one edge between nodes;-- therefor In Column 23, Lines 57-60, in Claim 14, delete "distributing the global inverted index containing the list of all directly connected nodes to the data servers to facilitate a network computer breadth-first distance traversal." and insert --maintaining an index of which partial graphs are stored on which data servers.-- therefor